US012032867B2

(12) United States Patent
Lee et al.

(10) Patent No.: US 12,032,867 B2
(45) Date of Patent: Jul. 9, 2024

(54) SOURCE DEVICE AND SINK DEVICE FOR SHARING EXPANDED SCREEN, AND METHODS OF OPERATING THE SAME

(71) Applicant: SAMSUNG ELECTRONICS CO., LTD., Suwon-si (KR)

(72) Inventors: Younglok Lee, Suwon-si (KR); Bongkyu Kim, Suwon-si (KR); Sanghun Lee, Suwon-si (KR); Seungbum Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/096,847

(22) Filed: Jan. 13, 2023

(65) Prior Publication Data
US 2023/0161542 A1 May 25, 2023

Related U.S. Application Data

(63) Continuation of application No. PCT/KR2022/012504, filed on Aug. 22, 2022.

(30) Foreign Application Priority Data

Oct. 18, 2021 (KR) .................. 10-2021-0138310
Jan. 17, 2022 (KR) .................. 10-2022-0006767

(51) Int. Cl.
*G06F 3/14* (2006.01)
*H04N 21/41* (2011.01)
*H04N 21/4363* (2011.01)

(52) U.S. Cl.
CPC ....... *G06F 3/1454* (2013.01); *H04N 21/4122* (2013.01); *H04N 21/43637* (2013.01)

(58) Field of Classification Search
CPC .............. G06F 3/1454; H04N 21/4122; H04N 21/43637; H04N 21/462
See application file for complete search history.

(56) References Cited

U.S. PATENT DOCUMENTS 10,121,449 B2 * 11/2018 Kimn .................... G06F 3/1454
10,264,213 B1 * 4/2019 Sculley ................... H04N 7/15
(Continued)

FOREIGN PATENT DOCUMENTS

JP      2001-197461    7/2001
KR      10-0206302     7/1999
(Continued)

OTHER PUBLICATIONS

International Search Report for PCT/KR2022/012504, dated Nov. 30, 2022, 3 pages.
(Continued)

*Primary Examiner* — Ibrahim A Khan
(74) *Attorney, Agent, or Firm* — Nixon & Vanderhye, P.C.

(57) ABSTRACT

An example source device includes a wireless communication module, a memory, and a processor. The processor may transmit an expanded screen, generated by the source device to be displayed on a sink device connected to the source device, to the sink device through the wireless communication module. The expanded screen may be a screen displayed on a display of the sink device in association with a first screen displayed on a display of the source device to expand a task space of the source device. The source device may identify a screen focused by an input device connected to the source device among the first screen displayed on the display of the source device and a second screen displayed on the display of the sink device. The source device may switch a processing scheme to process an input event generated by the input device, based on at least one of a (Continued)

display mode of the sink device or whether the focused screen is the first screen or the second screen.

18 Claims, 16 Drawing Sheets

(56) References Cited

U.S. PATENT DOCUMENTS

| | | | | |
|---|---|---|---|---|
| 10,354,618 | B2* | 7/2019 | Thangadorai | H04N 21/43637 |
| 11,212,123 | B2* | 12/2021 | Yoon | H04W 52/0229 |
| 11,231,901 | B2* | 1/2022 | Lee | G06F 3/0481 |
| 2012/0088548 | A1* | 4/2012 | Yun | G08C 23/04 |
| | | | | 455/557 |
| 2012/0088549 | A1* | 4/2012 | Yun | H04N 21/4586 |
| | | | | 455/566 |
| 2015/0061968 | A1* | 3/2015 | Park | G06F 3/1423 |
| | | | | 345/2.1 |
| 2015/0082241 | A1* | 3/2015 | Kang | H04N 7/15 |
| | | | | 715/803 |
| 2015/0189498 | A1* | 7/2015 | Chen | H04W 4/80 |
| | | | | 455/420 |
| 2017/0160882 | A1* | 6/2017 | Park | G06F 3/0346 |
| 2017/0351396 | A1* | 12/2017 | Passeri | G06F 3/04845 |
| 2018/0070122 | A1* | 3/2018 | Baek | H04N 21/4438 |
| 2020/0117350 | A1* | 4/2020 | Zhu | G06F 3/1415 |
| 2021/0181939 | A1* | 6/2021 | Lee | G06F 3/04812 |
| 2022/0300153 | A1* | 9/2022 | Gu | H04M 1/72412 |
| 2022/0398059 | A1* | 12/2022 | Zhu | G06F 3/0482 |
| 2023/0259246 | A1* | 8/2023 | Niu | G06F 3/0481 |
| 2023/0273812 | A1* | 8/2023 | Bian | G06F 3/04886 |
| | | | | 709/202 |
| 2023/0333703 | A1* | 10/2023 | Zhou | G06F 3/038 |

FOREIGN PATENT DOCUMENTS

| | | |
|---|---|---|
| KR | 10-0828624 | 5/2008 |
| KR | 10-0928643 | 11/2009 |
| KR | 10-1195520 | 10/2012 |
| KR | 10-1287839 | 7/2013 |
| KR | 10-2013-0116478 | 10/2013 |
| KR | 10-2015-0028383 | 3/2015 |
| KR | 10-2015-0031859 | 3/2015 |
| KR | 10-2017-0013738 | 2/2017 |
| KR | 10-2017-0095683 | 8/2017 |
| KR | 10-2018-0042643 | 4/2018 |
| KR | 10-2018-0052302 | 5/2018 |
| KR | 10-1925027 | 12/2018 |

OTHER PUBLICATIONS

[Online], Huawei Matebook 14s, https://consumer.huawei.com/en/laptops/matebook-14s/, printed Jan. 12, 2023, 2 pages.

* cited by examiner

SOURCE DEVICE AND SINK DEVICE FOR SHARING EXPANDED SCREEN, AND METHODS OF OPERATING THE SAME

CROSS-REFERENCE TO RELATED APPLICATIONS

This application is a continuation application of International Application No. PCT/KR2022/012504 designating the United States, filed on Aug. 22, 2022, in the Korean Intellectual Property Receiving Office and claiming priority to Korean Patent Application No. 10-2021-0138310, filed on Oct. 18, 2021, and Korean Patent Application No. 10-2022-0006767, filed on Jan. 17, 2022, in the Korean Intellectual Property Office, the disclosures of which are incorporated by reference herein in their entireties.

BACKGROUND

1. Field

Various embodiments of the disclosure relate to a source device and a sink device that share an expanded screen, and methods of operating the source device and the sink device.

2. Description of Related Art

Mirroring may refer, for example, to displaying a screen of an electronic device such as a smartphone or a tablet personal computer (PC) on another electronic device (e.g., a television (TV), a monitor, a projector, etc.). For example, since a size of a display screen of a terminal may be limited, mirroring can allow a user to use content provided by the terminal through a device, such as a TV, having a large screen. Alternatively, if a user needs to show a colleague how to work online, he or she can mirror a computer screen so that the colleague can watch how he or she works on a tablet. In this case, a device that provides a screen to another electronic device may be called a "source device", and a device that receives the screen may be called a "sink device".

SUMMARY

When a sink device mirrors a screen of a source device (e.g., a personal computer (PC)) and/or expands the screen of the source device and displays the expanded screen, the source device may process an input event of a basic input device (e.g., a keyboard, or a mouse). However, if the sink device minimizes the mirrored screen and/or the expanded screen of the source device to be invisible, in a state in which a session with the source device is maintained, it may be impossible to control the screen displayed on the sink device through an input device connected to the source device. In addition, if the mirrored screen or the expanded screen of the source device is displayed with a reduced size in a pop-up window, it may be possible to control the mirrored screen or the expanded screen of the source device using the input device connected to the source device in the pop-up window. However, it may be impossible to control a screen in areas other than the pop-up window. In addition, if a mouse is moved from the reduced mirrored screen displayed in the pop-up window to a screen of the sink device, the input event may be switched by leaving the pop-up window, which may reduce usability.

According to example embodiments, a source device may wirelessly share an expanded screen with at least one sink device to implement a second screen in the at least one sink device.

According to example embodiments, if the expanded screen is displayed on a plurality of sink devices, the source device may control the expanded screen displayed on the sink devices with continuity by changing a scheme of processing an input event according to a screen focused by an input device connected to the source device and/or display modes of the sink devices.

According to an example embodiment, a source device includes a wireless communication module, a memory, and a processor, wherein the processor is configured to transmit an expanded screen, generated by the source device to be displayed on a sink device connected to the source device, to the sink device through the wireless communication module, the expanded screen being a screen displayed on a display of the sink device in association with a first screen displayed on a display of the source device to expand a task space of the source device, to identify a screen focused by an input device connected to the source device among the first screen displayed on the display of the source device and a second screen displayed on the display of the sink device, and to switch a processing scheme to process an input event generated by the input device, based on at least one of a display mode of the sink device or whether the focused screen is the first screen or the second screen.

According to an example embodiment, a sink device includes a wireless communication module, a display module, a memory, and a processor, wherein the processor is configured to receive an expanded screen, generated by a source device to be displayed on the sink device, from the source device through the wireless communication module, the expanded screen being a screen displayed on a display of the sink device in association with a first screen displayed on a display of the source device to expand a task space of the source device, to identify a display mode of the display module, and to display an input event generated by an input device connected to the source device on one of the expanded screen, a second screen displayed on the display of the sink device, and a reduced screen generated by reducing the expanded screen, according to the display mode and a processing scheme switched in the source device based on the display mode, when a screen focused by the input device is the second screen among the first screen and the second screen.

According to an example embodiment, a method of operating a source device includes transmitting an expanded screen, generated by the source device to be displayed on a sink device connected to the source device, to the sink device, the expanded screen being a screen displayed on a display of the sink device in association with a first screen displayed on a display of the source device to expand a task space of the source device, identifying a screen focused by an input device connected to the source device among the first screen displayed on the display of the source device and a second screen displayed on the display of the sink device, and switching a processing scheme to process an input event generated by the input device based on a display mode of the sink device to a first scheme of allowing the source device to display the input event or a second scheme of transmitting a control signal to allow the sink device to display the input event, when the focused screen is the second screen of the sink device.

According to an example embodiment, a method of operating a sink device includes receiving an expanded screen, generated by a source device to be displayed on the sink device, from the source device, the expanded screen being a screen displayed on a display of the sink device in association with a first screen displayed on a display of the source device to expand a task space of the source device, identifying a display mode of the sink device, and displaying an input event generated by an input device connected to the source device on one of the expanded screen, a second screen of the sink device, and a reduced screen generated by reducing the expanded screen, according to the display mode and a processing scheme switched in the source device based on the display mode, when a screen focused by the input device is the first screen of the sink device among the first screen and the second screen.

According to example embodiments, a source device may control a screen of a sink device through an input device connected to the source device without restriction even though a display mode of the sink device is changed.

According to example embodiments, a source device may enhance usability of a user by focusing and continuously controlling a screen of a sink device using an input device connected to the source device, instead of using an input device connected to the sink device itself.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
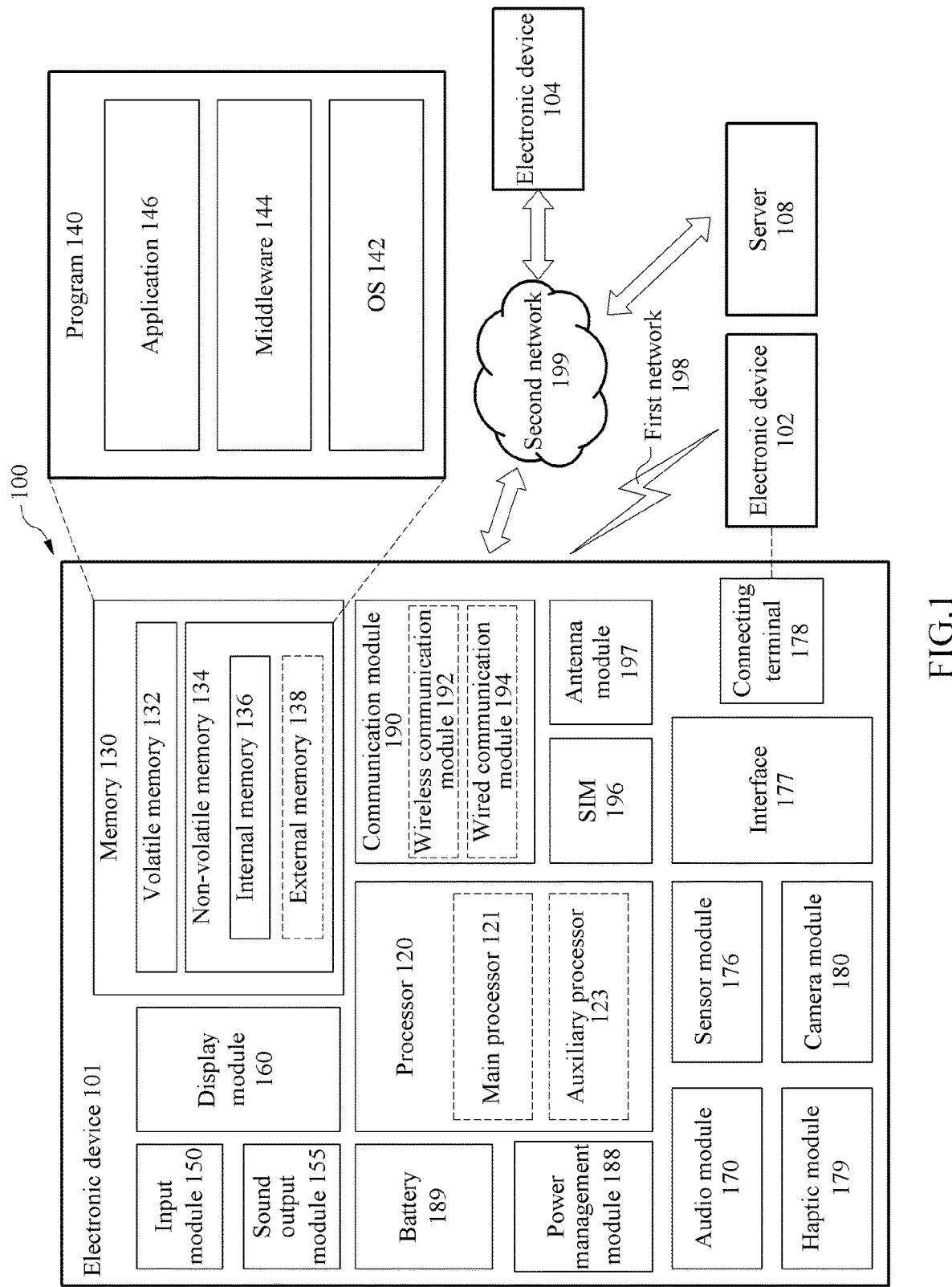
FIG. 1 is a block diagram illustrating an electronic device in a network environment according to various example embodiments.

Hereinafter, various example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or a fingerprint sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image pixels, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101.

According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
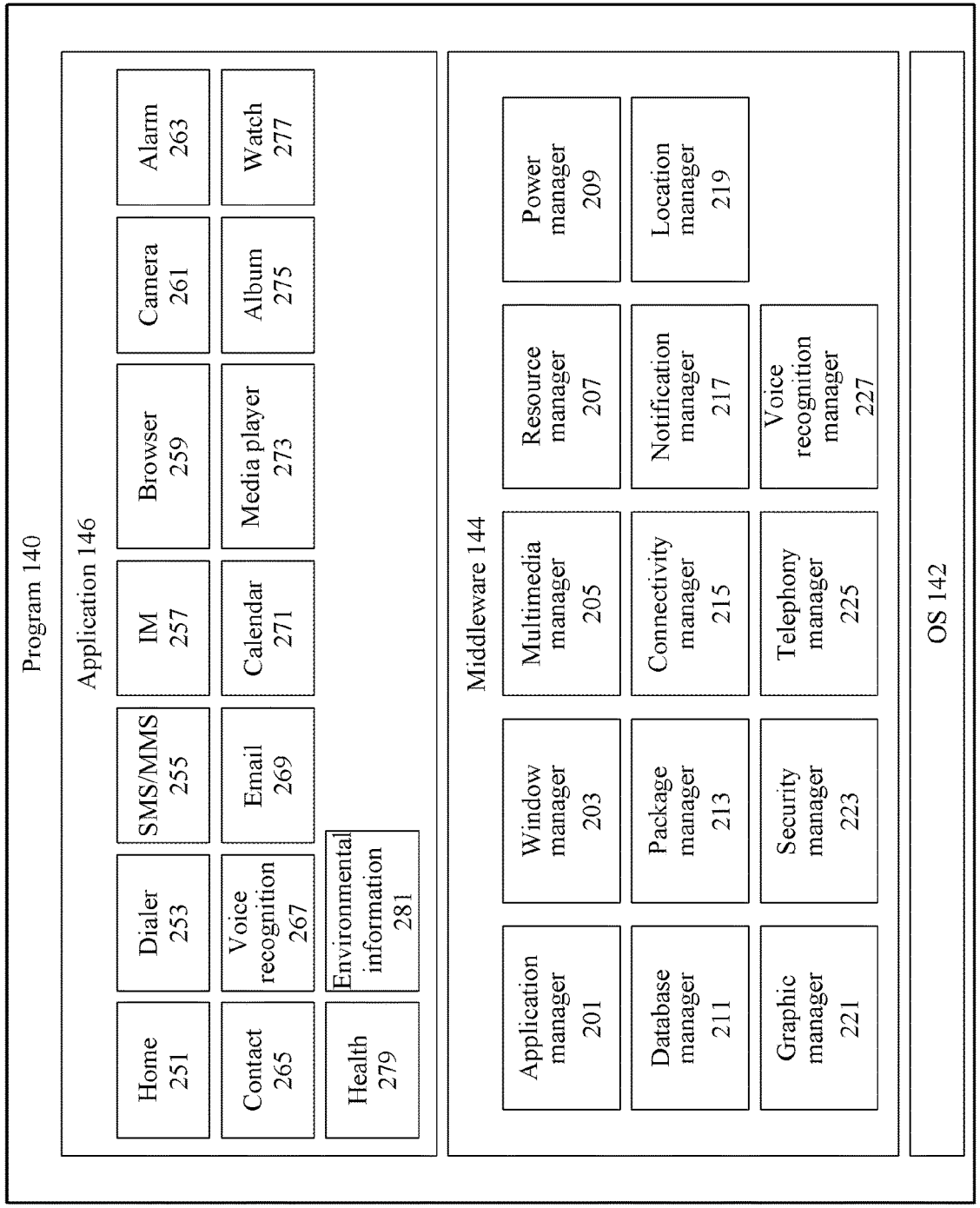
FIG. 2 is a block diagram illustrating a program according to various example embodiments.

FIG. 2 is a block diagram 200 illustrating a program 140 according to various example embodiments. According to an example embodiment, the program 140 may include an OS 142 to control one or more resources of the electronic device 101, middleware 144, or an application 146 executable in the OS 142. The OS 142 may include, for example, Android™ iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and an external electronic device. The notification manager 217, for example, may provide a function to notify a user of an occurrence of a specified event (e.g., an incoming call, a message, or an alert). The location manager 219, for example, may manage position information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and an external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

The electronic devices according to various example embodiments may be various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," may include any one of the items listed together in the corresponding one of the phrases, or all possible combinations thereof. Terms such as "1st", "2nd", or "first" or "second" may simply be used to distinguish the component from other components in question, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101 of FIG. 1). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" storage medium may refer, for example, to a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
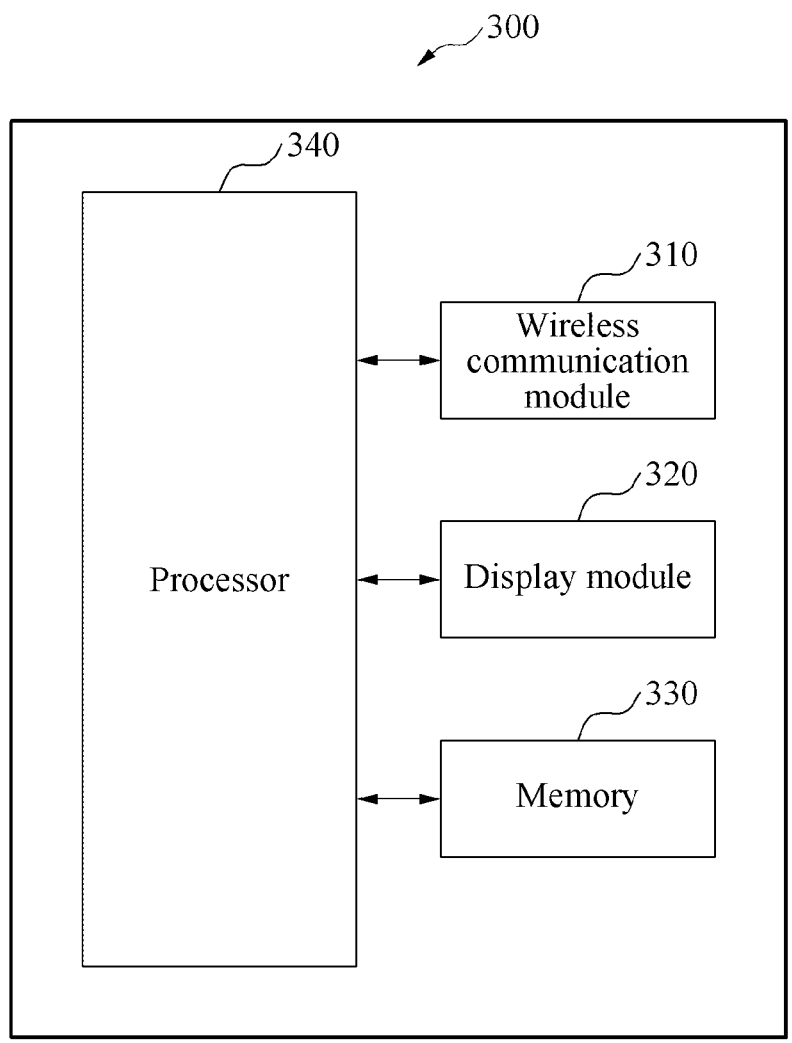
FIG. 3 is a block diagram illustrating a source device according to an example embodiment.

FIG. 3 is a block diagram illustrating a source device according to an example embodiment. Hereinafter, a source device 300 (e.g., the electronic devices 101, 102, and 104 of FIG. 1, a source device 610 of FIGS. 6A and 6B, and a source device 710 of FIGS. 7A and 7B) may, for example, correspond to a device configured to provide an expanded screen (e.g., expanded screens 520 and 530 of FIG. 5A, and/or an expanded screen 720 of FIGS. 7A and 7B) to a sink device (e.g., the electronic devices 101, 102, and 104 of FIG. 1, a sink device 400 of FIG. 4, and/or sink devices 630 and 650 of FIGS. 6A and 6B). The source device 300 may be, for example, a personal computer (PC) or a notebook computer, but is not limited thereto.

The source device 300 may share the expanded screens 520, 530, and 720 of the source device 300 with the sink devices 101, 102, 104, 400, 630, and 650. Here, the source device 300 and the sink devices 101, 102, 104, 400, 630, and 650 may be close to each other and may, for example, be connected to the same wireless fidelity (Wi-Fi) network. The source device 300 may correspond to, for example, an electronic device that supports Miracast. The source device 300 may transcode a screen of a display module 320 and transmit the expanded screens 520, 530, and 720 to the sink devices 101, 102, 104, 400, 630, and 650 through wireless communication, for example, Wi-Fi, to share the expanded screens 520, 530, and 720 with the sink devices 101, 102, 104, 400, 630, and 650.

The expanded screens 520, 530, and 720 may, for example, be screens generated by the source device 300 to be displayed on the sink device 400 connected to the source device 300. The expanded screens 520, 530, and 720 may correspond to screens that are displayed on a display of the sink device 400 in association with a first screen displayed on a display of the source device 300 to expand a task space of the first screen of the source device 300. Here, the above expanded screen displayed "in association with" the first screen displayed on the display of the source device 300 may include the same content as an image displayed on the display of the source device 300, and may also include an image obtained by transcoding an image, for example, images different in a size, a resolution, and an aspect ratio, and an image displayed on the display of the source device 300, into a video format and/or audio format determined according to codec settings between the source device 300 and the sink device 400.

The source device 300 may perform screen sharing and/or mirroring with other electronic devices (e.g., mobile terminals, tablets, and wearable devices) by transmitting the expanded screens 520, 530, and 720 to the other electronic devices.

The expanded screens 520, 530, and 720 may correspond to screens including the same content as the first screen output from the display module 320 of the source device 300. The expanded screens 520, 530, and 720 may have, for example, the same resolution and/or the same aspect ratio as those of the first screen output from the display module 320 of the source device 300, or have a resolution or aspect ratio different from those of the first screen output from the display module 320 of the source device 300.

For example, the expanded screens 520, 530, and 720 may also be displayed on the sink devices 101, 102, 104, 400, 630, and 650 in a form of a reduced screen (e.g., reduced screens 563 and 573 of FIG. 5C, and/or a reduced screen 745 of FIG. 7B) that is less in size than the first screen output from the display module 320 of the source device 300 by a user setting. The reduced screens 563, 573, and 745 reduced from the expanded screens 520, 530, and 720 may also be generated by the source device 300, or the sink devices 101, 102, 104, 400, 630, and 650.

The video format and/or audio format of the expanded screen 520, 530, 720 may be determined according to codec settings between the source device 300 and the sink devices 101, 102, 104, 400, 630, and 650. The source device 300 may process an input event (hereinafter, referred to as a "first input event") occurring in a first screen displayed on a display connected to the source device 300 by an input device (hereinafter, referred to as a "first input device") connected to the source device 300, and/or a second screen (hereinafter, referred to as a "second screen of a sink device") displayed on a display connected to the sink device 400. In addition, the source device 300 may receive and process an input event (hereinafter, referred to as a "second input event"), for example, a touch input 1250 to a touch screen (e.g., a touch screen 1240 of FIG. 12), an input of a mouse (e.g., a mouse 1230 of FIG. 12), and a key input of a keyboard (e.g., a keyboard 1210 of FIG. 12), that occur in the sink devices 101, 102, 104, 400, 630, and 650 through a user input back channel (UIBC).

The UIBC may have a reverse channel structure that is also referred to as a user interface back channel, and may be configured to allow the sink device 400 to transmit user inputs occurring in the sink device 400 to the source device 300. The reverse channel structure may also allow user interface functions and upper layer messages for transmitting user inputs to reside in an Internet protocol (IP) transmission layer between the sink device 400 and the source device 300. To promote reliable transmission and sequential transfer of data packets including user input data, the UIBC may also be configured to be executed on communication protocols based on different packets, for example, a transmission control protocol/Internet protocol (TCP/IP) or a user datagram protocol (UDP). In addition, the UIBC may also be configured to transmit various types of user input data including cross-platform user input data. For example, the source device 300 may execute an OS A, and the sink device 400 may execute another operating system such as an OS B or C. In an example embodiment, the UIBC may be used to transmit information associated with an input event occurring in a sink device between the source device 300 and the sink device 400, and accordingly flexibility for a platform and/or OS used by each device may be provided.

A screen on which a last input event by the first input device connected to the source device 300 occurs may be referred to as a "focused screen", which will be further described below with reference to FIGS. 6A and 6B. For example, when a mouse (e.g., a mouse 605 of FIGS. 6A and 6B, and the mouse 1230 of FIG. 12) is connected to the source device 300, and when a mouse input event such as clicking, dragging, or movement of a cursor of the mouse 605, 1230 occurs on the second screen (e.g., the expanded screens 520 and 530 of FIG. 5A, second screens 540 and 550 of FIG. 5B, screens 560 and 570 of FIG. 5C, the expanded screen 720 and a second screen 730 of FIG. 7A, and/or a screen 740 of FIG. 7B) of the sink device 400, the second screen 520, 530, 540, 550, 560, 570, 720, 730, 740 of the sink device 400 may be a focused screen. In this example, coordinates of a point at which a cursor of the mouse 605, 1230 is located by the last input event on the focused screen may be stored.

Hereinafter, the term "second screen" used herein in relation to a target to be focused may refer, for example, to the second screen 520, 530, 540, 550, 560, 570, 720, 730, 740 displayed on the display of the sink device 400 regardless of a display mode. In addition, the term "second screen" used in relation to the display mode may refer, for example, to the second screen 540, 550, 730 of the sink device 400 itself displayed in a minimization mode.

If an input event occurs on a focused screen, the source device 300 may set coordinates for processing the input event. For example, if the focused screen is the second screen 520, 530, 540, 550, 560, 570, 720, 730, 740 of the sink device 400 and if the display mode of the sink device 400 is the reduction mode or the minimization mode, the source device 300 may switch a processing scheme from a first scheme of allowing the source device 300 to display an input event to a second scheme by which the source device 300 transmits a control signal to allow the sink device 400 to display the input event to the sink device 400.

More specifically, if the display mode of the sink device 400 is changed from an expansion mode of displaying the expanded screen 520, 530, 720 to a minimization mode of displaying the second screen (e.g., the second screens 540 and 550 of FIG. 5B, and/or the second screen 730 of FIG. 7A) of the sink device 400, instead of displaying the expanded screen 520, 530, 720, or a reduction mode of displaying a reduced screen obtained by reducing an expanded screen and if a currently focused screen is the second screen 520, 530, 540, 550, 560, 570, 720, 730, 740 of the sink device 400, the source device 300 may switch the processing scheme from the first scheme to the second scheme. If the focused screen is changed from the first screen of the source device 300 to the second screen 520, 530, 540, 550, 560, 570, 720, 730, 740 of the sink device 400 and if the display mode of the sink device 400 is changed to the reduction mode or the minimization mode, the source device 300 may also switch the processing scheme from the first scheme to the second scheme. According to the switching of the processing scheme, the source device 300 may transmit, to the sink device 400, a control signal to allow an input object (e.g., a mouse overlay icon) corresponding to the input event to be displayed at coordinates of a last position of an input device (e.g., the mouse 605 and the keyboard 607 of FIGS. 6A and 6B, and/or the mouse 1230 of FIG. 12) at a point in time at which a mode is changed. In this example, processing of an input event additionally occurring on the focused screen may also be performed at corresponding coordinates (e.g., coordinates of a last position of a mouse).

In an example embodiment, a target for focusing may be position coordinates on a screen of a display that generates an icon or indicates an occurrence of an event. According to an example embodiment, if an input event includes depth information, for example, a virtual display or a holographic display of augmented reality (AR) glasses (e.g., a wearable device 1220 of FIG. 12), three-dimensional (3D) position coordinates on the screen of the display may be a target for focusing.

For example, it may be assumed that the source device 300 is an electronic device based on the Windows OS, and that the sink devices 101, 102, 104, 400, 630, and 650 are electronic devices based on the Android OS. In this example, the source device 300 may wirelessly share the expanded screens 520, 530, and 720 of the source device 300 with the sink devices 101, 102, 104, 400, 630, and 650 through a mirroring function, to implement the expanded screens 520, 530, and 720 as second screens in the sink devices 101, 102, 104, 400, 630, and 650. The expanded screen 520, 530, 720 may be displayed identically on electronic devices (e.g., the sink devices 101, 102, 104, 400, 630, and 650) other than the source device 300 to be regarded as a screen of a second display of the source device 300. Accordingly the expanded screen 520, 530, 720 may also be called a "second screen". In addition, the expanded screen 520, 530, 720 may also include a virtual screen displayed by a wearable device, for example, AR glasses (e.g., the wearable device 1220 of FIG. 12).

Referring to FIG. 3, the source device 300 may include a wireless communication module 310 (e.g., the wireless communication module 192 of FIG. 1), the display module 320 (e.g., the display module 160 of FIG. 1), a memory 330 (e.g., the memory 130 of FIG. 1), and a processor 340 (e.g., the processor 120 of FIG. 1).

The wireless communication module 310 (e.g., including wireless communication circuitry) may receive a display mode of each of the sink devices 101, 102, 104, 400, 630, and 650 from the sink devices 101, 102, 104, 400, 630, and 650.

Figure 6A:
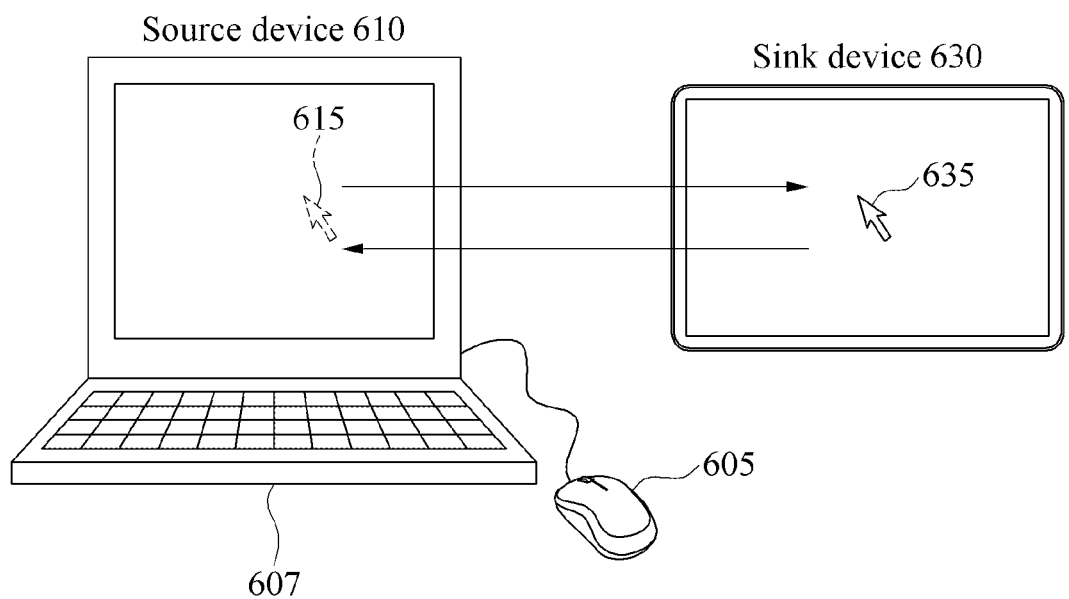
FIGS. 6A and 6B are diagrams illustrating examples of an operation performed when a focused screen is changed by an input device connected to a source device according to example embodiments.
Figure 6B:
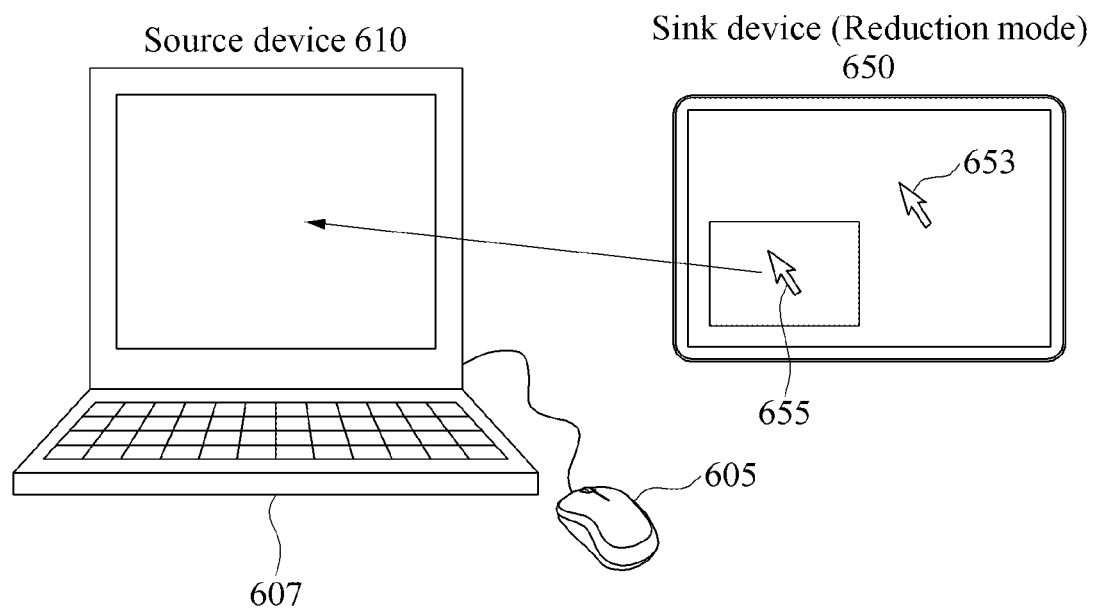
Figure 12:
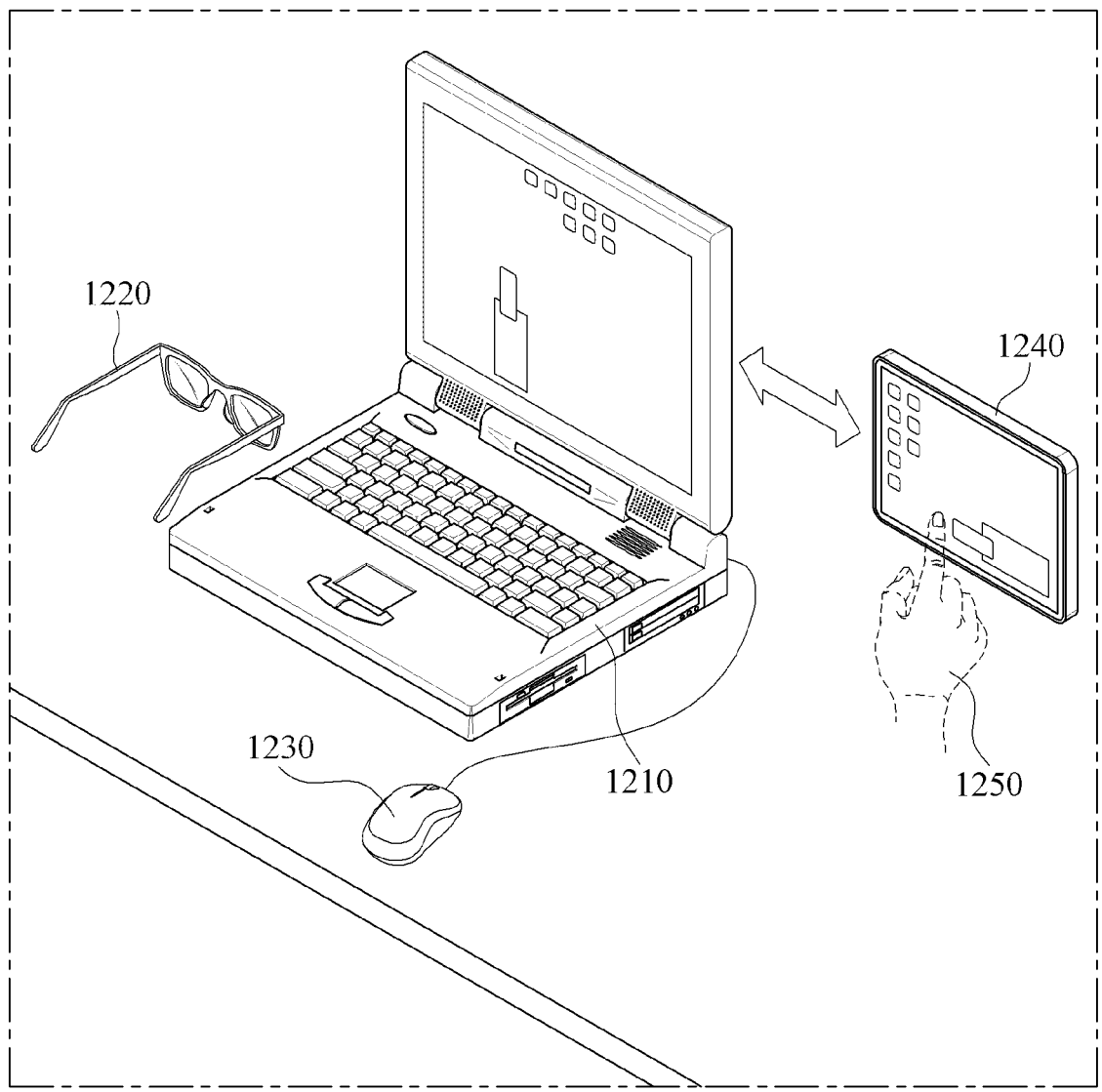
FIG. 12 is a diagram illustrating an input device according to an example embodiment.

The wireless communication module 310 may perform wireless communication with the sink devices 101, 102, 104, 400, 630, and 650, and may receive an input event of an input device (e.g., the input module 150 of FIG. 1, the mouse 605 and the keyboard 607 of FIGS. 6A and 6B, and the keyboard 1210, the wearable device 1220, the mouse 1230, and/or the touch screen 1240 of FIG. 12). The input device 150, 605, 607, 1210, 1220, 1230, 1240 may include, for example, various devices connected to the source device 300 and/or the sink device 101, 102, 104, 400, 630, 650 via wires or wirelessly to transmit an operation of a user, regardless of a shape.

The input device 150, 605, 607, 1210, 1220, 1230, 1240 may include, for example, a pen and a microphone, in addition to the keyboard 1210, the wearable device 1220, the mouse 1230, and the touch screen 1240 as shown in FIG. 12, but is not limited thereto.

For example, if the focused screen is switched between the first screen of the source device 300 and the second screen 520, 530, 540, 550, 560, 570, 720, 730, 740 of the sink device 400, a position in which an input object (e.g., an overlay mouse icon) corresponding to an input event is generated may need to be changed. Accordingly, the processor 340 (e.g., including processing circuitry) may also transmit an input event occurring after a change in the display mode to the sink devices 101, 102, 104, 400, 630, and 650 through the wireless communication module 310.

The display module 320 may output an image corresponding to the expanded screen 520, 530, 720. The "image corresponding to the expanded screen 520, 530, 720" may be an image of the first screen displayed by the display module 320 of the source device 300.

The memory 330 may store computer-executable instructions. The memory 330 may also store a variety of information generated in a processing process of the processor 340. In addition, the memory 330 may store a variety of data and programs. The memory 330 may include, for example, a volatile memory (e.g., the volatile memory 132 of FIG. 1) or a non-volatile memory (e.g., the non-volatile memory 134 of FIG. 1). The memory 330 may include a high-capacity storage medium such as a hard disk to store a variety of data.

The processor 340 may execute instructions stored in the memory 330 by accessing the memory 330.

The processor 340 may transmit the expanded screen 520, 530, 720, generated by the source device 300 to be displayed on the sink device 400 connected to the source device 300, to the sink device 400 through the wireless communication module 310. The expanded screen 520, 530, 720 may be a screen that may be displayed on the display of the sink device 400 in association with the first screen displayed on the display of the source device 300 to expand the task space of the source device 300.

The processor 340 may recognize a connection state between the source device 300 and each of the sink devices 101, 102, 104, 400, 630, and 650 through wireless communication by the wireless communication module 310. The processor 340 may perform wireless communication with at least one sink device 400 of which a connection state is recognized among the sink devices 101, 102, 104, and 400 and may receive a display mode of the sink device 400.

The processor 340 may identify a screen focused by the input device 150, 605, 607, 1210, 1220, 1230, 1240 connected to the source device 300 among the first screen displayed on the display of the source device 300 and the second screen 520, 530, 540, 550, 560, 570, 720, 730, 740 displayed on the display of the sink device 400.

The processor 340 may switch the processing scheme of processing an input event generated by the input device 150, 605, 607, 1210, 1220, 1230, 1240, based on at least one of the display mode of the sink device 400 or whether the focused screen is the first screen of the source device 300 or the second screen 520, 530, 540, 550, 560, 570, 720, 730, 740 of the sink device 400.

The display mode of the sink device 400 may include, for example, an expansion mode of displaying the expanded screen 520, 530, 720, a minimization mode of displaying the second screen 540, 550, 730 of the sink device 400 instead of the expanded screen 520, 530, 720, and a reduction mode of displaying the screen 560, 570, 740 including the reduced screen 563, 573, 745 generated by reducing the expanded screen 520, 530, 720, but is not limited thereto. The reduced screen 563, 573, 745 may be displayed on the screen 560, 570, 740 in the form of overlaying on a pop-up window, however, the example embodiments are not limited thereto.

Although a scheme of changing the display mode of the sink device 400 has been described above for convenience of description, the example embodiments may equally be applicable to a scheme of changing a size of an expanded screen without a need to change the display mode in the sink device 400.

The display mode of the sink device 400 and screen configurations of the source device 300 and the sink device 400 according to each display mode will be described in more detail with reference to FIGS. 5A, 5B, and 5C below.

The processing scheme according to an example embodiment may include, for example, a first scheme of allowing the source device 300 to display an input event, and a second scheme by which the source device 300 transmits a control signal to allow the sink device 400 to display an input event to the sink device 400, but is not limited thereto.

The input event may include, for example, a multi-modal type such as any one or any combination of a gaze movement input in the wearable device 1220 of FIG. 12, a hand movement input, and an input according to head tracking, an input event of the mouse 1230, which includes a click event of the mouse 1230, a movement event of the mouse 1230, and a mouse drag event, a key input event of the keyboard 1210, the touch input 1250 to the touch screen 1240, a pen input, an input according to gesture recognition, and/or a voice input, but is not limited thereto.

Hereinafter, the input device 150, 605, 607, 1210, 1220, 1230, 1240 connected to the source device 300 may be referred to, for example, as a "first input device". In addition, the input device 150, 1210, 1220, 1230, 1240 connected to at least one sink device 400 may be referred to, for example, as a "second input device".

An input event of the first input device 150, 605, 607, 1210, 1220, 1230, 1240 may be referred to, for example, as a "first input event", and an input event of the second input device 150, 1210, 1220, 1230, 1240 may be referred to, for example, as a "second input event".

Hereinafter, the "input event" described herein may refer to, for example, the first input event occurring in the first input device 150, 605, 607, 1210, 1220, 1230, 1240 connected to the source device 300 unless otherwise specified. For example, when the focused screen is the second screen of the sink device 400 and when the display mode of the sink device 400 is the reduction mode or the minimization mode, the processor 340 may switch the processing scheme from the first scheme of allowing the source device 300 to display an input event to the second scheme by which the source device 300 transmits a control signal to allow the sink device 400 to display an input event to the sink device 400.

For example, when the display mode of the sink device 400 is changed from the expansion mode to the reduction mode or the minimization mode and when the focused screen is the second screen 520, 530, 540, 550, 560, 570, 720, 730, 740 of the sink device 400; or when the focused screen is changed from the first screen of the source device 300 to the second screen 520, 530, 540, 550, 560, 570, 720, 730, 740 of the sink device 400 and when the display mode of the sink device 400 is changed to the reduction mode or the minimization mode, the processor 340 may switch the processing scheme from the first scheme to the second scheme. When the display mode of the sink device 400 is the reduction mode, the processor 340 may process an input event differently depending on whether the focused screen is an inside area (e.g., an inside area 655 of FIG. 6B) or an outside area (e.g., an outside area 653 of FIG. 6B) of the reduced screen 563, 573, 745.

In an example, when the display mode of the sink device 400 is the reduction mode and when an input event occurs on the inside area 655 of the reduced screen 563, 573, 745, the processor 340 may receive position information of a point at which the input event occurs on the inside area 655 of the reduced screen 563, 573, 745, from the sink device 400 and update the expanded screen 520, 530, 720 based on the received position information. The processor 340 may update at least one of the reduced screen 563, 573, 745 or the expanded screen 520, 530, 720, by converting the position information of the point at which the input event occurs according to the resolution of the reduced screen 563, 573, 745, received from the sink device 400, to match a resolution of the screen of the source device 300.

In another example, when the display mode of the sink device 400 is the reduction mode and when an input event occurs on the outside area 653 of the reduced screen 563, 573, 745, the processor 340 may allow the sink device 400 to display an input object (e.g., a mouse overlay icon) corresponding to an input event (e.g., a mouse click event) by transmitting coordinates of a point corresponding to the input event to the sink device 400 according to the second scheme.

In an example in which the display mode of the sink device 400 is the minimization mode and the focused screen is the second screen 520, 530, 540, 550, 560, 570, 720, 730, 740 of the sink device 400, when the resolution of the expanded screen 520, 530, 720 and the resolution of the sink device 400 are different from each other, the processor 340 may determine the coordinates of the point corresponding to the input event based on the resolution of the sink device 400 and may transmit the coordinates of the point corresponding to the input event to the sink device 400 so that the sink device 400 may display an input object corresponding to the input event.

In an example in which the display mode of the sink device 400 is changed from the expansion mode to the minimization mode and the focused screen is the second screen 520, 530, 540, 550, 560, 570, 720, 730, 740 of the sink device 400, when the resolution of the expanded screen 520, 530, 720 and the resolution of the sink device 400 are different from each other, the processor 340 may determine coordinates of the point corresponding to the input event based on the resolution of the sink device 400. The processor 340 may transmit the coordinates of the point corresponding to the input event to the sink device 400 so that the sink device 400 may display the input object corresponding to the input event.

In another example, when the focused screen is the second screen 520, 530, 540, 550, 560, 570, 720, 730, 740 of the sink device 400, when the display mode of the sink device 400 is the reduction mode or the minimization mode, and when the input event is a mouse input event, the processor 340 may transmit a control signal to allow the sink device 400 to display a cursor moved in response to the mouse input event, together with coordinate information of the cursor, to the sink device 400 according to the second scheme.

The display mode of the sink device 400 may be changed, for example, by a user setting and/or by changing an application setting. For example, the display mode of the sink device 400 may be changed or switched from the expansion mode shown in FIG. 5A to the minimization mode shown in FIG. 5B or the reduction mode shown in FIG. 5C, may be changed or switched from the minimization mode shown in FIG. 5B to the expansion mode shown in FIG. 5A or the reduction mode shown in FIG. 5C, or may be changed or switched from the reduction mode shown in FIG. 5C to the expansion mode shown in FIG. 5A or the minimization mode shown in FIG. 5B.

The extension mode may correspond, for example, to a mode of displaying the expanded screen 510 generated and transmitted by the source device 300 on the entire screen of the sink device 400 without a change. The sink device 400 may display the expanded screen 520, 530, 720 on the entire screen of the display in the expansion mode.

The minimization mode may correspond, for example, to a mode in which the expanded screen 520, 530, 720 is hidden in a background of the sink device 400 and is invisible and in which the second screen (e.g., the second screens 540 and 550 of FIG. 5B and the second screen 730 of FIG. 7A) of the sink device 400 itself, instead of the expanded screen 520, 530, 720, is displayed on the entire screen. Since the expanded screen 520, 530, 720 is minimized and invisible on the second screen 540, 550, 730 displayed in the minimization mode, the expanded screen 520, 530, 720 may also be referred to as a "minimized screen" instead of the second screen.

In the minimization mode, the source device 300 may stop generating and transmitting of the expanded screen 520, 530, 720. In the minimization mode, the sink device 400 may minimize the expanded screen 520, 530, 720 by hiding the expanded screen 520, 530, 720 in the background of the sink device 400, and may display the second screen 540, 550, 730 that is a screen of the sink device 400.

The reduction mode may correspond, for example, to a mode in which the source device 300 reduces the expanded screen 520, 530, 720 at a predetermined ratio and transmits the reduced screen, or in which the sink device 400 displays the reduced screen 563, 573, 745 generated by reducing the expanded screen 520, 530, 720 at a predetermined rate. The reduced screen 563, 573, 745 may be overlaid and displayed in the form of, for example, picture in picture (PIP). Since the reduced screen 563, 573, 745 has, for example, a PIP form, the reduced screen 563, 573, 745 may also be referred to as "PIP screens", and the reduction mode may also be referred to as a "PIP mode".

In the reduction mode, the sink device 400 may display a screen (e.g., the screens 560 and 570 of FIG. 5C, and/or the screen 740 of FIG. 7B) including the reduced screen 563, 573, 745 generated by reducing the expanded screen 520, 530, 720 and overlaid on a portion of the second screen. Operations of the source device 300 and the sink device 400 when the display mode of the sink device 400 is changed will be described in more detail with reference to FIGS. 7A and 7B below.

The processor 340 may update at least one of the expanded screen 520, 530, 720 or the reduced screen 563, 573, 745 by reflecting a result of processing an input event according to the display mode.

For example, when the display mode is the reduction mode, the processor 340 may receive information associated with an input event newly occurring in the screen 560, 570, 740 from the sink device 400. In this example, the processor 340 may receive the information associated with the input event through a separate channel (e.g., a UIBC). The processor 340 may update the reduced screen 563, 573, 745 by converting coordinates corresponding to a point at which the input event occurs according to the information associated with the input event, based on a difference between the resolution of the expanded screen 520, 530, 720 and the resolution of the sink device 400.

The processor 340 may focus on the second screen 520, 530, 540, 550, 560, 570, 720, 730, 740 of the sink device 400 in which a final (e.g., most recent) input event occurs among the sink devices 101, 102, 104, 400, 630, and 650 connected to the source device 300, and may receive the display mode of the focused sink device 400.

For example, when the display mode is the expansion mode, the processor 340 may directly process the input event and update the expanded screen 520, 530, 720 based on a result of processing the input event. In an example in which the display mode is the reduction mode or the minimization mode, and in which a focused screen corresponding to a screen on which a last (e.g., most recent) input event is generated by the input device 150, 605, 607, 1210, 1220, 1230, 1240 connected to the source device 300 is the second screen 520, 530, 540, 550, 560, 570, 720, 730, 740 of the sink device 400, if the resolution of the expanded screen 520, 530, 720 and the resolution of the sink device 400 are different from each other, the processor 340 may determine coordinates of a point corresponding to the input event based on the resolution of the sink device 400 and may transmit the coordinates of the point corresponding to the input event to the sink device 400, so that the sink device 400 may display an input object corresponding to the input event.

For example, when the display mode is one of the minimization mode and the reduction mode, the processor 340 may stop transmitting of the expanded screen 520, 530, 720, and transmit the input event to the sink device 400 so that the sink device 400 may process the input event. In this example, when the focused screen is the second screen of the sink device 400, the processor 340 may transmit the reduced screen 563, 573, 745, on which an image of an input object that has been overlaid on the expanded screen 520, 530, 720 is not overlaid, to the sink device 400.

When the resolution of the expanded screen 520, 530, 720 is different from the resolution of the sink device 400, the processor 340 may change the resolution of the expanded screen 520, 530, 720 to match the resolution of the sink device 400. However, an operation of the processor 340 is not limited to the above-described operations, and the processor 340 may also perform at least one of operations that will be described below with reference to FIGS. 4 through 12 together with the above-described operation.

Figure 4:
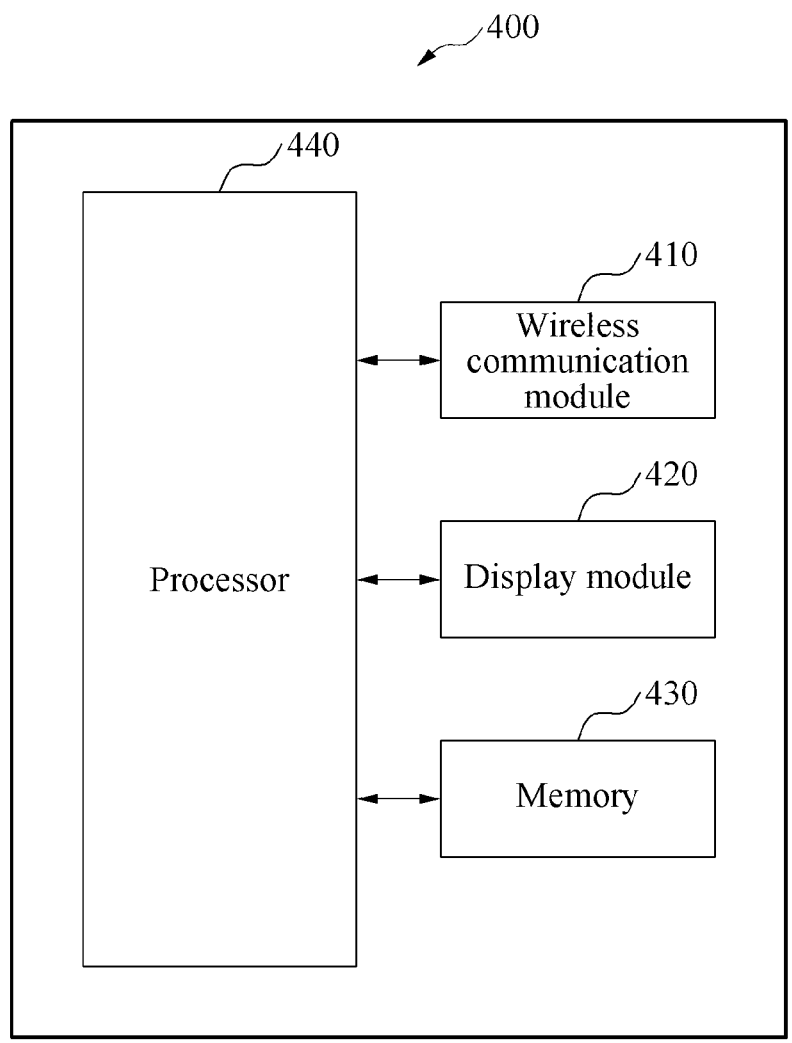
FIG. 4 is a block diagram illustrating a sink device according to an example embodiment.

FIG. 4 is a block diagram illustrating a sink device according to an example embodiment. Hereinafter, in the present specification, the sink device 400 (e.g., the electronic devices 101, 102, and 104 of FIG. 1, and/or the sink devices 630 and 650 of FIGS. 6A and 6B) may correspond to a device configured to establish communication with a source device (e.g., the electronic devices 101, 102, and 104 of FIG. 1, the source device 300 of FIG. 3, the source device 610 of FIGS. 6A and 6B, and/or the source device 710 of FIGS. 7A and 7B) through a Wi-Fi display session and to share an expanded screen (e.g., the expanded screen 510 of FIG. 5A) generated and/or transmitted by the source device 300. The sink device 400 may include, for example, the electronic device 101 of FIG. 1, such as a smartphone, a laptop, or a tablet, or a wearable electronic device (e.g., the wearable device 1220 of FIG. 12) such as smart glasses, but is not limited thereto.

Referring to FIG. 4, the sink device 400 according to an example embodiment may include a wireless communication module 410 (e.g., the wireless communication module 192 of FIG. 1), a display module 420 (e.g., the display module 160 of FIG. 1), a memory 430 (e.g., the memory 130 of FIG. 1), and a processor 440 (e.g., the processor 120 of FIG. 1).

The wireless communication module 410 (e.g., including wireless communication circuitry) may receive the expanded screen 510 transmitted by the source device 300. The wireless communication module 410 may receive at least one of a first input event of a first input device (e.g., the input module 150 of FIG. 1, the mouse 605 and the keyboard 607 of FIGS. 6A and 6B, and the keyboard 1210, the wearable device 1220, the mouse 1230, and/or the touch screen 1240 of FIG. 12) received from the source device 300, or a second input event of a second input device 150, 1210, 1220, 1230, 1240 connected to the sink device 400.

In addition, the wireless communication module 410 may transmit, to the source device 300, the display mode of the sink device 400 corresponding to at least one of an occurrence time of an input event or an occurrence time of a mode change event in which the display mode is changed.

The display module 420 may display at least one of an expanded screen (e.g., the expanded screens 520 and 530 of FIG. 5A, and/or the expanded screen 720 of FIG. 7A) displayed on the display of the sink device 400 in the expansion mode, a second screen (e.g., the second screens 540 and 550 of FIG. 5B, and the second screen 730 of FIG. 7A) of the sink device 400 displayed on the display of the sink device 400 in the minimization mode, or a screen (e.g., the screens 560 and 570 of FIG. 5C, and/or the screen 740 of FIG. 7B) including the reduced screen 563, 573, 745 generated by reducing the expanded screen 520, 530, 720 displayed on the display of the sink device 400 in the reduction mode. The memory 430 may store computer-executable instructions. The memory 430 may also store a variety of information generated in a processing process of the processor 440. In addition, the memory 430 may store a variety of data and programs. The memory 430 may include, for example, a volatile memory (e.g., the volatile memory 132 of FIG. 1) or a non-volatile memory (e.g., the non-volatile memory 134 of FIG. 1). The memory 430 may include a high-capacity storage medium such as a hard disk to store a variety of data.

The processor 440 (e.g., including processing circuitry) may receive the extended screen 520, 530, 720, generated by the source device 300 to be displayed on the sink device 400, from the source device 300 through the wireless communication module 410. The processor 440 may identify a display mode of the display module 420. The processor 440 may transmit the identified display mode to the source device 300.

The processor 440 may execute instructions by accessing the memory 430. If a screen focused by an input device (hereinafter, referred to as a "first input device") connected to the source device 300 is the second screen of the sink device 400 among the first screen of the source device 300 and the second screen of the sink device 400, the processor 440 may display an input event generated by the input device 150, 605, 607, 1210, 1220, 1230, 1240 on one of the second screen 540, 550, 730 of the sink device 400 and the reduced screen 563, 573, 745 generated by reducing the expanded screen 520, 530, 720, based on the display mode and a processing scheme switched in the source device 300 based on the display mode. Here, the processing scheme may refer to a scheme of processing an input event. The processing scheme may include at least one of a first scheme of allowing an input event to be displayed on the first screen of the source device 300, or a second scheme by which the source device 300 transmits a control signal to display an input event on the second screen of the sink device 400 to the device 400.

The processor 440 may update a screen including an icon based on a result of processing an input event for each display mode. The icon may be, for example, an overlay mouse icon displayed on the second screen of the sink device 400 corresponding to a final input of an input event, but is not limited thereto.

For example, when the focused screen is the second screen 520, 530, 540, 550, 560, 570, 720, 730, 740 of the sink device 400, and when the display mode is a reduction mode of displaying the screen 560, 570 including the reduced screen 563, 573, 745, or a minimization mode of displaying the second screen 540, 550, 730 of the sink device 400, instead of the expanded screen 520, 530, 720, the processor 440 may display the input event on the second screen 520, 530, 540, 550, 560, 570, 720, 730, 740 of the sink device 400 according to the control signal received from the source device 300 by the second scheme.

In an example, when the display mode of the sink device 400 is a reduction mode of displaying the screen 560, 570, 740, and when an input event occurs on an inside area of the reduced screen 563, 573, 745 in the screen 560, 570, 740, the processor 440 may transmit information associated with the input event occurring in the inside area of the reduced screen 563, 573, 745 to the source device 300. In this example, the information associated with the input event may include, for example, at least one of a type of the input event, a resolution of the reduced screen 563, 573, 745 in which the input event occurs, or coordinate information corresponding to a point at which the input event occurs based on the resolution of the reduced screen 563, 573, 745.

In another example, when the display mode is the reduction mode and when an input event occurs on an outside area of the reduced screen 563, 573, 745, the processor 440 may display an input object corresponding to the input event based on coordinates of a point at which the input event occurs, received from the source device 300 according to the second scheme. In this example, the "displaying of the input object" may be understood to include, for example, updating content to be displayed on a screen in response to an input of the keyboard 1210, and changing a position of a cursor and/or an icon in response to the touch input 1250 of the touch screen 1240, in addition to generating and/or displaying an overlay mouse icon corresponding to a mouse input event.

The processor 440 may focus on position coordinates at which a final (e.g., most recent) input event is processed on one of the expanded screen 520, 530, 720, the second screen 540, 550, 730 of the sink device 400, and the screen 560, 570, 740, based on the occurrence time of the mode change event in which the display mode is changed. The processor 440 may display a processing result corresponding to the input event on the focused position coordinates.

For example, when the focused screen is the second screen (e.g., the second screens 540 and 550 of FIG. 5B, and the second screen 730 of FIG. 7A) of the sink device 400, and when the display mode of the sink device 400 is the reduction mode or the minimization mode, the processor 440 may receive information on an input event from the source device 300 and display the input event on the second screen 520, 530, 540, 550, 560, 570, 720, 730, 740 of the sink device 400 based on the information associated with the input event. If the input event is a mouse input event, the processor 440 may display an input object corresponding to the mouse input event based on a control signal to allow the sink device 400 to display a cursor moved in response to the mouse input event and coordinate information of the cursor, transmitted according to the second scheme.

If the display mode is the reduction mode or the minimization mode and if the focused screen is the second screen 520, 530, 540, 550, 560, 570, 720, 730, 740 of the sink device 400, the processor 440 may display an input object corresponding to the input event on the focused second screen 520, 530, 540, 550, 560, 570, 720, 730, 740 of the sink device 400.

For example, when the display mode is changed from the expansion mode to the minimization mode, the processor 440 may perform focusing switching to switch an area in which the input event is to be processed from the expanded screen 520, 530, 720 to the second screen 540, 550, 730, based on the occurrence time of the mode change event in which the display mode is changed. The focusing switching may be performed by, for example, an input of a specific keyboard, or an execution of a specific icon on the second screen of the sink device 400. In this example, when the display mode is changed due to a difference between the resolution of the expanded screen 520, 530, 720 and an actual resolution of the sink device 400, coordinate transformation may be performed on the display screen of the sink device 400. In an example embodiment, the mode change event may be transmitted from the sink device 400 to the source device 300, and coordinate transformation according to the changed display mode may be processed in the source device 300. The source device 300 may transmit coordinates transformed in response to a change in the display mode to the sink device 400 so that the sink device 400 may display a processing result corresponding to the input event.

If the display mode is changed from the expansion mode to the reduction mode, the processor 440 may switch an area in which an input event is to be processed from the expanded screen 520, 530, 720 to an area corresponding to a point where the input event occurs in the screen 560, 570, 740, based on the occurrence time of the mode change event in which the display mode is changed. For example, the display mode may be changed from the expansion mode to the reduction mode in a state in which a mouse icon is positioned in a central portion of the expanded screen 520, 530, 720. In this example, the processor 440 may switch the area in which the input event is to be processed from the expanded screen 520, 530, 720 to an area corresponding to the point where the input event occurs in the screen 560, 570, 740. In an example, if the reduced screen 563, 573, 745 is overlaid on the central portion of the screen 560, 570, 740, the reduced screen 563, 573, 745 in the screen 560, 570, 740 may be focused by the input device 150, 605, 607, 1210, 1220, 1230, 1240 connected to the source device 300 and switched as an area in which an input event is to be processed. In another example, if the reduced screen 563, 573, 745 is displayed on a partial area of the screen 560, 570, 740, the processor 440 may switch an area of the second screen 565, 575 corresponding to the outside area of the reduced screen 563, 573, 745 in the screen 560, 570, 740 to an area in which an input event is to be processed.

If the type of the input event is an input of the mouse 605, 1230, the processor 440 may generate and/or display a mouse icon corresponding to the input event at position coordinates at which a final (most recent) input event is processed. For example, the processor 440 may display a mouse overlay icon based on coordinate information of a cursor moved in response to a mouse movement event according to a control signal to allow the sink device 400 to display the coordinate information of the cursor moved in response to the mouse movement event, transmitted according to the second scheme.

For example, when the display mode is one of the minimization mode and the reduction mode, when an input event occurs on the expanded screen 520, 530, 720 or the reduced screen 563, 573, 745, and when the type of the input event is an input of the mouse 605, 1230, the processor 440 may update a position of an icon corresponding to the input event based on a variation in a position of the input event at a point at which the input event occurs.

If the display mode is the minimization mode and if the input event is the first input event, the processor 440 may process the first input event to match the processing scheme of the sink device 400 and may display the first input event on the second screen 540, 550. In an example, when the first input event is a mouse input event, the processor 440 may transform coordinate information of the mouse 605, 1230 to actual coordinates of the sink device 400 and may change an up/down event of the mouse 605, 1230 to corresponding input information of the sink device 400, so that the mouse input event may be displayed on a screen.

In another example, when the first input event is a key input event of the keyboard 607, 1210, the processor 440 may generate a key event corresponding to the sink device 400, so that the key input event may be displayed on a screen.

If the display mode is the expansion mode, the processor 440 may store position coordinates of the display of the sink device 400 in which a final input event among input events occurs.

However, an operation of the processor 440 is not limited to the above-described operations, and the processor 440 may also perform at least one of operations that will be described below with reference to FIGS. 5A through 12 together with the above-described operation.

Figure 5A:
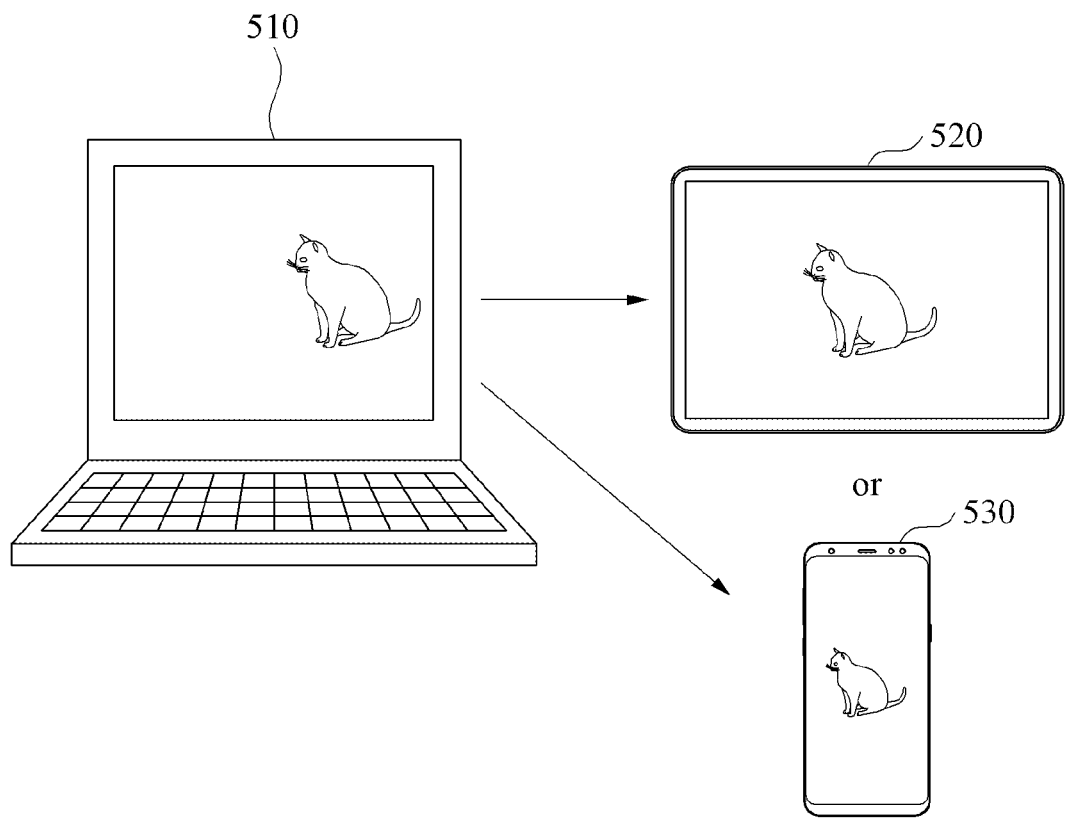
FIGS. 5A, 5B, and 5C are diagrams illustrating screen configurations of a source device and a sink device in display modes according to example embodiments.
Figure 5B:
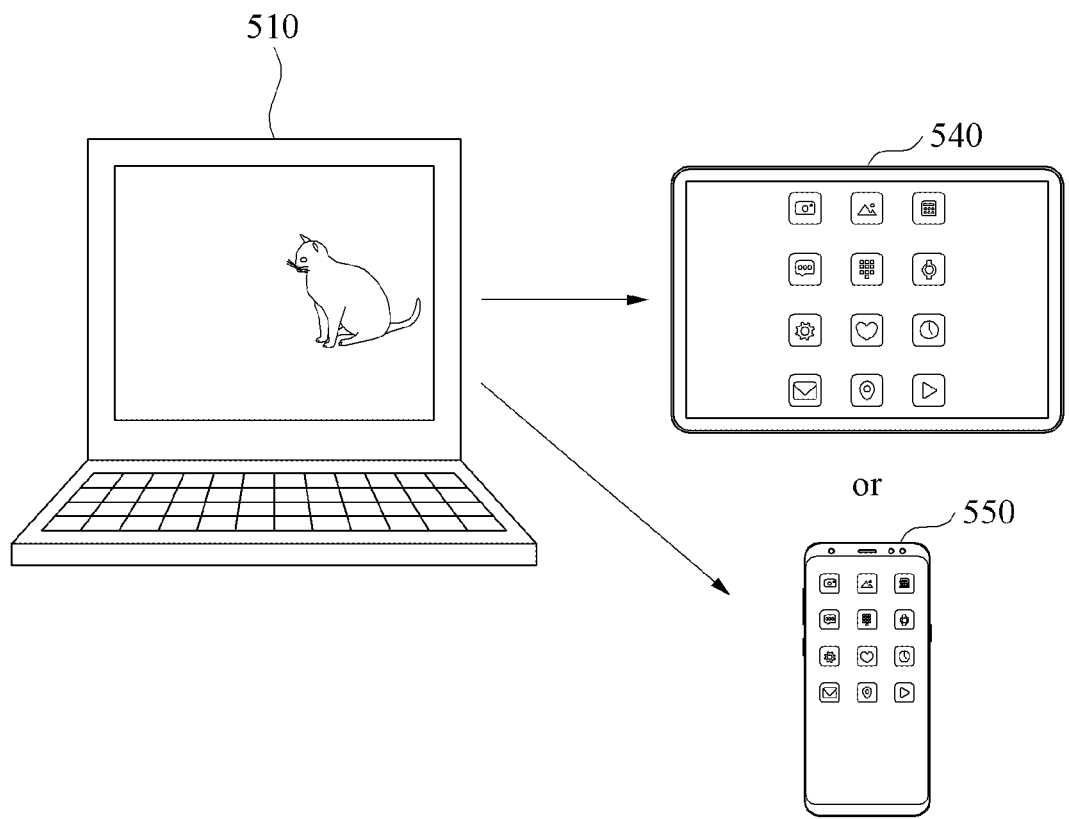
Figure 5C:
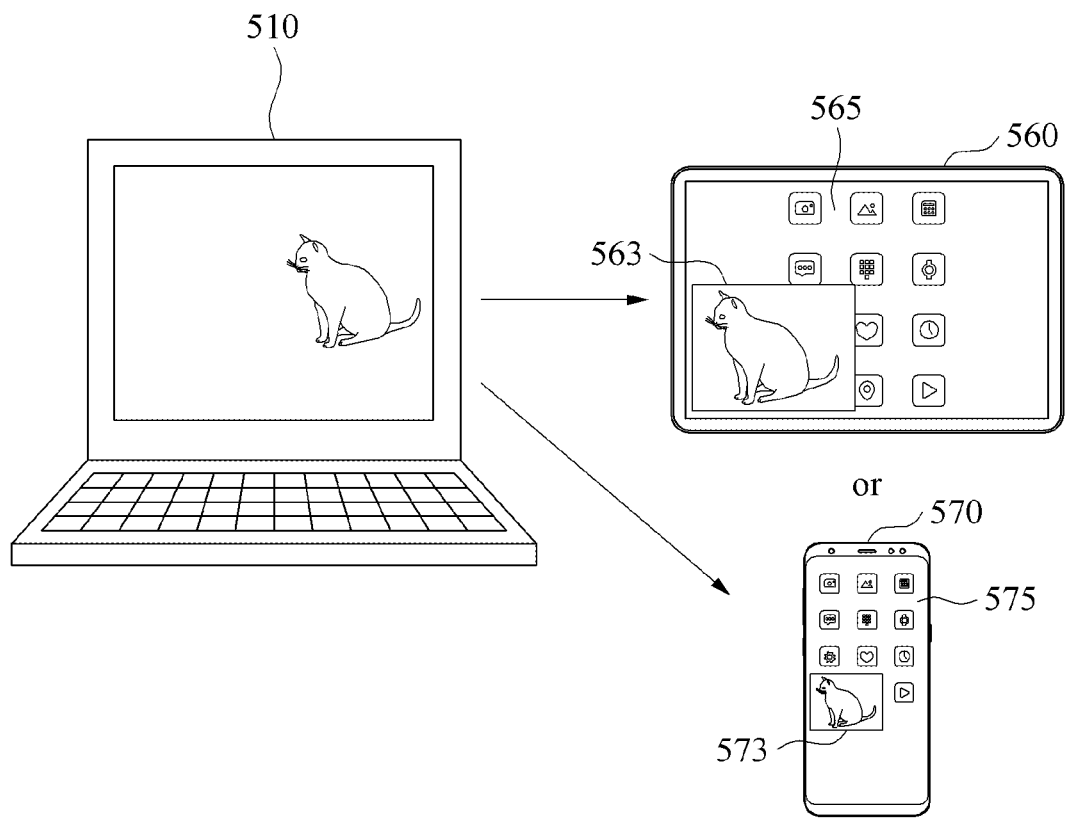

FIGS. 5A, 5B, and 5C are diagrams illustrating screen configurations of a source device and a sink device in display modes according to example embodiments. For example, "N" sink devices (e.g., the electronic devices 101, 102, and 104 of FIG. 1, the sink device 400 of FIG. 4, and/or the sink devices 630 and 650 of FIGS. 6A and 6B) may be connected to a source device (e.g., the electronic devices 101, 102, and 104 of FIG. 1, the source device 300 of FIG. 3, the source device 610 of FIGS. 6A and 6B, and/or the source device 710 of FIGS. 7A and 7B). In an example embodiment, a sink device with a display that displays a screen currently focused by an input device (e.g., the input module 150 of FIG. 1, the mouse 605 of FIG. 6A, and the keyboard 1210, the wearable device 1220, the mouse 1230, and/or the touch screen 1240 of FIG. 12) connected to the source device 300 among the "N" sink devices 101, 102, 104, 400, 630, and 650 of which connection states are recognized by the source device 300 may be referred to as, for example a "target sink device".

In this example, the sink devices 101, 102, 104, 400, 630, and 650 may display the expanded screen 510 generated and transmitted by the source device 300 on displays of the sink devices in association with the first screen displayed on the display of the source device 300 without a change, as shown in the expanded screens 520 and 530 of FIG. 5A. The sink devices 101, 102, 104, 400, 630, and 650 may minimize and display the expanded screen 510 transmitted by the source device 300 to be invisible, as shown in the second screens 540 and 550 of FIG. 5B. Alternatively, the sink devices 101, 102, 104, 400, 630, and 650 may reduce the expanded screen 510 transmitted by the source device 300 at a predetermined ratio and display the reduced screens 563 and 573 included in the screens 560 and 570, as shown in FIG. 5C.

The source device 300 may recognize the connection states of the sink devices 101, 102, 104, 400, 630, and 650 based on positions corresponding to the source device 300 and the "N" sink devices 101, 102, 104, 400, 630, and 650. The source device 300 may process continuous input events of the input devices 150, 605, 607, 1210, 1220, 1230, and 1240 that occur between the source device 300 and the sink devices 101, 102, 104, 400, 630, and 650, which will be described below.

The source device 300 may focus on a display corresponding to a screen on which an input event is most recent processed, based on a point at which the input event of the input device 150, 605, 607, 1210, 1220, 1230, 1240 is last processed, may identify a display mode of the focused display, and may process the input event of the input device 150, 605, 607, 1210, 1220, 1230, 1240 differently for each display mode.

FIG. 5A illustrates configurations of the expanded screens 520 and 530 displayed on a display of the target sink device 400 in the expansion mode according to an example embodiment.

For example, when the display mode is the expansion mode, the target sink device 400 may display the expanded screen 510 provided by the source device 300 (e.g., a PC or a notebook) on the entire second screen of the display without a change, as shown in the expanded screens 520 and 530. Since the expanded screen 510 transmitted by the source device 300 is displayed on the display of the target sink device 400 without a change as shown in the expanded screens 520 and 530 when the display mode is the expansion mode, a screen display on the display of the target sink device 400 in the expansion mode may also be referred to as an "expanded screen".

For example, when the focused display is the display of the target sink device 400 and when the display mode of the target sink device 400 is the expansion mode, the target sink device 400 may process an input event in a similar manner to that of the source device 300, through the expanded screens 520 and 530 shared by the target sink device 400. In an example embodiment, for convenience of description, the target sink device 400 receives an input event from the source device 300 through a UIBC, however, the example embodiments are not limited thereto. For example, the target sink device 400 may use various channels to receive an input event from the source device 300. Here, a second input event (e.g., the touch input 1250 of FIG. 12, an input of a mouse, or an input to a keyboard) generated by the second input device 150, 1210, 1220, 1230, 1240 connected to the target sink device 400 on the expanded screens 520 and 530 displayed on the display of the target sink device 400 may be directly processed by the target sink device 400.

For example, when the display mode of the target sink device 400 is the minimization mode or the reduction mode, not the expansion mode, the source device 300 may focus on a second screen of a display connected to the target sink device 400 based on a point at which an input event is last processed. The source device 300 may transmit the input event to the target sink device 400 that displays the focused second screen, so that the target sink device 400 may directly process the input event.

The display mode in the target sink device 400 may be changed by, for example, a user setting or an application program. If the display mode is changed, the target sink device 400 may transmit a mode change event and/or information corresponding to the mode change event to the source device 300. The information corresponding to the mode change event may include, for example, a point in time at which the mode change event occurs, a screen focused at the point in time at which the mode change event occurs, and a changed display mode, but is not limited thereto.

If the mode change event and/or the information corresponding to the mode change event is received, the source device 300 may process an input event for the display of the target sink device 400 in response to the mode change event.

FIG. 5B illustrates configurations of the second screens 540 and 550 displayed on the display of the target sink device 400 in the minimization mode according to an example embodiment.

For example, when the display mode is the minimization mode, the expanded screen 510 transmitted by the source device 300 may be minimized and may disappear (e.g., not be displayed), and the second screen 540, 550 that is the screen of the target sink device 400 may be displayed on the entire display screen of the target sink device 400. Since only the second screen that is the screen of the target sink device 400 is displayed on the display of the target sink device 400 when the display mode is the minimization mode, a screen displayed on a target sink device in the minimization mode may also be called a "second screen" or a "minimized screen".

The expanded screen 520, 530 displayed on the display of the target sink device 400 in the expansion mode may be hidden in the background of the target sink device 400 and minimized in the minimization mode, so that the expanded screen 520, 530 may not be recognized by a user.

If the display mode of the target sink device 400 is the minimization mode, the source device 300 may stop generating and/or transmitting of the expanded screen 510. Here, a first input event generated by the input device 150, 605, 607, 1210, 1220, 1230, 1240 on the expanded screen 520, 530 displayed on the target sink device 400 in the expansion mode may be processed on the second screen 540, 550 that is the screen of the target sink device 400, even though the expanded screen 520, 530 is not visible because the expanded screen 520, 530 operates in the background.

For example, when the display mode is the minimization mode, the target sink device 400 may focus on a screen (e.g., the second screen of the target sink device 400) of a display on which an input event occurs at a point in time at which the expanded screen 510 transmitted by the source device 300 is minimized, and may process the input event based on the focused screen. If the type of input event is a mouse input event, the target sink device 400 may generate a new overlay mouse icon corresponding to an input event in a position in which a last mouse input event is processed at a point in time at which the screen 510 is minimized, that is, a point in time at which a mode change event occurs. The target sink device 400 may update a position of the overlay mouse icon according to a variation in a position of a second input event that occurs after the last mouse input event.

In this example, a resolution of the expanded screen 510 transmitted by the source device 300 and a resolution of the target sink device 400 may be different from each other. For example, when the resolution of the expanded screen 510 and the resolution of the target sink device 400 are different from each other, the source device 300 may receive the resolution of the sink device 400 itself from the sink device 400 and change a resolution of the first screen of the display connected to the source device 300 to match a resolution of the second screen of the display connected to the target sink device 400, to prevent a malfunction due to movement coordinates of a mouse corresponding to the second input event. If the resolution of the expanded screen 510 and the resolution of the target sink device 400 are different from each other, the source device 300 may determine coordinates of a point corresponding to an input event based on the resolution of the target sink device 400. The source device 300 may transmit the coordinates of the point corresponding to the input event to the target sink device 400, so that the target sink device 400 may display an input object corresponding to the input event.

According to an example embodiment, only a portion of the first screen of the source device 300 may be mirrored to the second screen of the target sink device 400. Here, the "mirroring of only a portion of the first screen of the source device 300 to the second screen of the target sink device 400" may include, for example, mirroring only a video portion in an upper portion of a YouTube screen image displayed on the source device 300, instead of a video list in a lower portion, or determining a region of interest (ROI) on a screen displayed on the source device 300 and mirroring only the ROI. However, the example embodiments are not limited thereto. In this example, the source device 300 may also change the resolution of the second screen of the target sink device 400 to match a resolution of a portion of the first screen of the source device 300.

If the display mode is changed from the expansion mode to the minimization mode, a user may view a movement of a cursor of the mouse 605, 1230 corresponding to the input device 150, 605, 607, 1210, 1220, 1230, 1240 operating on the expanded screen 520, 530 without a change, and thus an effect of screen expansion may be maintained without a change. In addition, a movement of the input device 150, 605, 607, 1210, 1220, 1230, 1240 by the user in the target sink device 400 may be displayed to the user as if the user views the movement. However, actually, the source device 300 may receive an input event (i.e., the first input event) of the first input device 150, 605, 607, 1210, 1220, 1230, 1240 generated in the target sink device 400 and may transmit the input event back to the target sink device 400.

If the second input event is received, the target sink device 400 may focus on coordinates of a display corresponding to a position in which the input event is last processed at a minimization point in time at which the expanded screen 510 transmitted by the source device 300 is changed to the second screen 540, 550, that is, a point in time at which a mode changes, and may process the second input event based on the focused coordinates. For example, when a mouse input event is last processed on the expanded screen 520, 530, the target sink device 400 may generate a new overlay mouse icon in a position where the mouse input event is last processed on the second screen 540, 550, and may change a position of the overlay mouse icon based on a variation in a position of the second input event according to a result of processing a new second input event.

FIG. 5C illustrates configurations of the screens 560 and 570 (e.g., the screen 740 of FIG. 7B) displayed on the display of the target sink device 400 in a reduction mode according to an example embodiment.

In the reduction mode, the expanded screen 510 transmitted by the source device 300 may be reduced and overlaid on a portion of the screen 560, 570 as shown in the reduced screen 563, 573. In addition, since the reduced screen 563, 573 is overlaid on the second screen 565, 575 that is the screen of the target sink device 400, the second screen 565, 575 may be displayed on an outside area of the reduced screen 563, 573. For example, the reduced screen 563, 573 may be reduced to a size set by a user and displayed in a pop-up window.

A scheme of processing an input event continuously occurring in the reduced screen 563, 573, generated by reducing the expanded screen 510 transmitted by the source device 300, and the second screen 565, 575 that is the screen of the target sink device 400 in the screen 560, 570 in the reduction mode, will be described below.

As described above with reference to FIG. 5B, the target sink device 400 may focus on a screen (e.g., the first screen displayed on the display of the source device, or the second screen displayed on the display of the sink device) displayed on a display corresponding to a position in which a last input event is processed at an occurrence time of a mode change event. The target sink device 400 may generate an overlay mouse icon at position coordinates of an input event last processed on a screen of a corresponding display. Here, the source device 300 may transmit the expanded screen 510, on which an image (e.g., a mouse overlay image) of an input object overlaid on the expanded screen 510 transmitted by the source device 300 is not overlaid, to the target sink device 400, to prevent a mouse icon generated by the target sink device 400 on the second screen 565, 575 from overlapping the reduced screen 563, 573.

The source device 300 may receive the resolution of the target sink device 400 itself from the target sink device 400 and change the resolution of the first screen of the display connected to the source device 300 to match the resolution of the second screen of the target sink device 400, so that a user may still perceive one display as being connected.

For example, when an input event occurs on the second screen 565, 575 that is a screen of the target sink device 400 in the screen 560, 570, the target sink device 400 may focus on a display corresponding to a position in which the input event is last processed at a point in time at which the expanded screen 510 is minimized, as described above with reference to FIG. 5B, and may operate based on the focused display. When the type of the input event is a mouse input event, the target sink device 400 may generate a new overlay mouse icon corresponding to the input event in a position in which the last input event is processed at a point in time at which the expanded screen 510 is minimized, that is, the occurrence time of the mode change event. The target sink device 400 may update a position of the overlay mouse icon according to a variation in a position of the input event.

Here, the resolution of the expanded screen 510 and the resolution of the target sink device 400 may be different from each other. If the resolution of the expanded screen 510 and the resolution of the target sink device 400 are different from each other, the source device 300 may receive the resolution of the target sink device 400 itself from the target sink device 400 and determine coordinates of a point corresponding to the input event based on the resolution of the target sink device 400. The source device 300 may transmit the coordinates of the point corresponding to the input event to the target sink device 400 so that the target sink device 400 may display an input object corresponding to the input event, to prevent a malfunction due to movement coordinates of the mouse 605, 1230 corresponding to the input event.

If an input event occurs on an inside area of the reduced screen 563, 573 in the screen 560, 570, the target sink device 400 may retransmit the input event to the source device 300 through a UIBC, instead of directly processing the input event occurring on the inside area of the reduced screen 563, 573. If the input event is received through the UIBC, the source device 300 may process the input event for the expanded screen 510. In addition, for coordinate transformation of the input event occurring on the reduced screen 563, 573, the target sink device 400 may transmit information including coordinates of the input event based on the reduced screen 563, 573 and the resolution of the reduced screen 563, 573 to the source device 300. The source device 300 may process the input event for the expanded screen 510 based on the received resolution of the reduced screen 563, 573.

The source device 300 may change a processing scheme for the input device 150, 605, 607, 1210, 1220, 1230, 1240 for each display mode of the target sink device 400. The source device 300 may focus on a screen on which the last input event occurs in the expanded screen 510 of the target sink device 400 and transmit the input event to the target sink device 400 including the focused screen.

FIGS. 6A and 6B are diagrams illustrating examples of an operation performed when a focused screen is changed by an input device connected to a source device according to example embodiments. FIG. 6A illustrates an example in which a screen focused by the mouse 605 (e.g., the mouse 1230 in FIG. 12) among input devices, for example, the mouse 605 and the keyboard 607, connected to a source device 610 (e.g., the electronic devices 101, 102, and 104 of FIG. 1, and/or the source device 300 of FIG. 3) according to an example embodiment is changed from a first screen of the source device 610 to a second screen of a sink device 630 (e.g., the electronic devices 101, 102, and 104 of FIG. 1, and/or the sink device 400 of FIG. 4).

When a position pointed to by a cursor of the mouse 605 is changed from the first screen of the source device 610 to the second screen of the sink device 630, the source device 610 may transmit a screen on which a cursor icon 615 corresponding to the mouse 605 that is overlaid on an expanded screen (e.g., the expanded screens 520 and 530 of FIG. 5A, and/or the expanded screen 720 of FIG. 7A) is not overlaid to the sink device 400, and may transmit a control signal to display a cursor corresponding to the mouse 605 on the second screen of the sink device 630 to the sink device 630 by the second scheme. Accordingly, the cursor icon 615 displayed on the first screen of the source device 610 may disappear, and a cursor icon 635 may be displayed on the second screen of the sink device 630.

For example, if the cursor of the mouse 605 on the second screen of the sink device 630 moves back to the first screen of the source device 610, the sink device 630 may transmit position coordinates of the cursor of the mouse 605 moved from the second screen of the sink device 630 to the source device 610. In this example, the source device 610 may display a cursor icon corresponding to the mouse 605 again on the first screen of the source device 610, based on the position coordinates received from the sink device 630 according to the first scheme.

FIG. 6B illustrates an example in which a screen focused by the cursor of the mouse 605 connected to the source device 610 according to an example embodiment is changed to the outside area 653 of a reduced screen (e.g., the reduced screens 563 and 573 of FIG. 5C, and the reduced screen 745 of FIG. 7B) displayed on the second screen of the sink device 650 or the inside area 655 of the reduced screen 563, 573, 745. In this example, the display mode of the sink device 650 may be the reduction mode, and accordingly the display of the sink device 650 may display a screen (e.g., the screens 560 and 570 in FIG. 5C, and the screen 740 of FIG. 7B) including the reduced screen 563, 573, 745.

In an example, when the cursor of the mouse 605 is located on the inside area 655 of the reduced screen 563, 573, 745, the source device 610 may transmit a mouse input event occurring at a position of the cursor of the mouse 605 to the sink device 650 and may transmit a control signal to allow the sink device 650 to display an overlay mouse icon, according to the second scheme.

Although not shown in the drawings, for example, when the display mode of the sink device 650 is the minimization mode and when the screen focused by the cursor of the mouse 605 is the second screen of the sink device 650, the source device 610 may also transmit the control signal to allow the sink device 650 to display the overlay mouse icon to the sink device 650.

In another example, when the cursor of the mouse 605 is located on the inside area 655 of the reduced screen 563, 573, 745, the sink device 650 may inform the source device 610 of position coordinates of a point of the inside area 655 of the reduced screen 563, 573, 745 at which an input event is generated by the mouse 605. In this example, since the reduced screen 563, 573, 745 is generated by reducing an expanded screen (e.g., the expanded screen 510 of FIG. 5A) generated by the source device 610, the source device 610 may transform the position coordinates in the inside area 655 of the reduced screen 563, 573, 745, received from the sink device 650, to position coordinates of the expanded screen 520, 530, 720, and may display the input event on the expanded screen 520, 530, 720.

Table 1 shows a device for controlling a cursor for each display mode, a device for controlling a movement and click of a mouse according to a currently focused screen, and a used processing scheme according to an example embodiment.

TABLE 1

| Display mode | Cursor control | Focused screen | Mouse movement and click control | Processing scheme |
| --- | --- | --- | --- | --- |
| Expansion mode | Source device | Expanded screen | Source device | First scheme |
| Reduction mode | Sink device | Inside area of reduced scree | Sink device transmits coordinates to source device | First scheme |
| | | Outside area of reduced scree | Source device transmits control signal to sink device | Second scheme |
| Minimization mode | Sink device | Screen of sink device | Source device transmits control signal to sink device | Second scheme |

In Table 1, the display mode may be changed from the expansion mode to the reduction mode or the minimization mode, and accordingly the processing scheme may also be changed from the first scheme to the second scheme, so that coordinates may be transformed.

According to an example embodiment, when the second screen of the sink device 630, 650 is focused by an input device (e.g., the mouse 605) connected to the source device 610, the source device 610 may continue to transmit a control signal associated with an input event occurring on the second screen of the sink device 630, 650 to the sink device 630, 650, to maintain the feeling of use of the input device 605 without interruption.

Figure 7A:
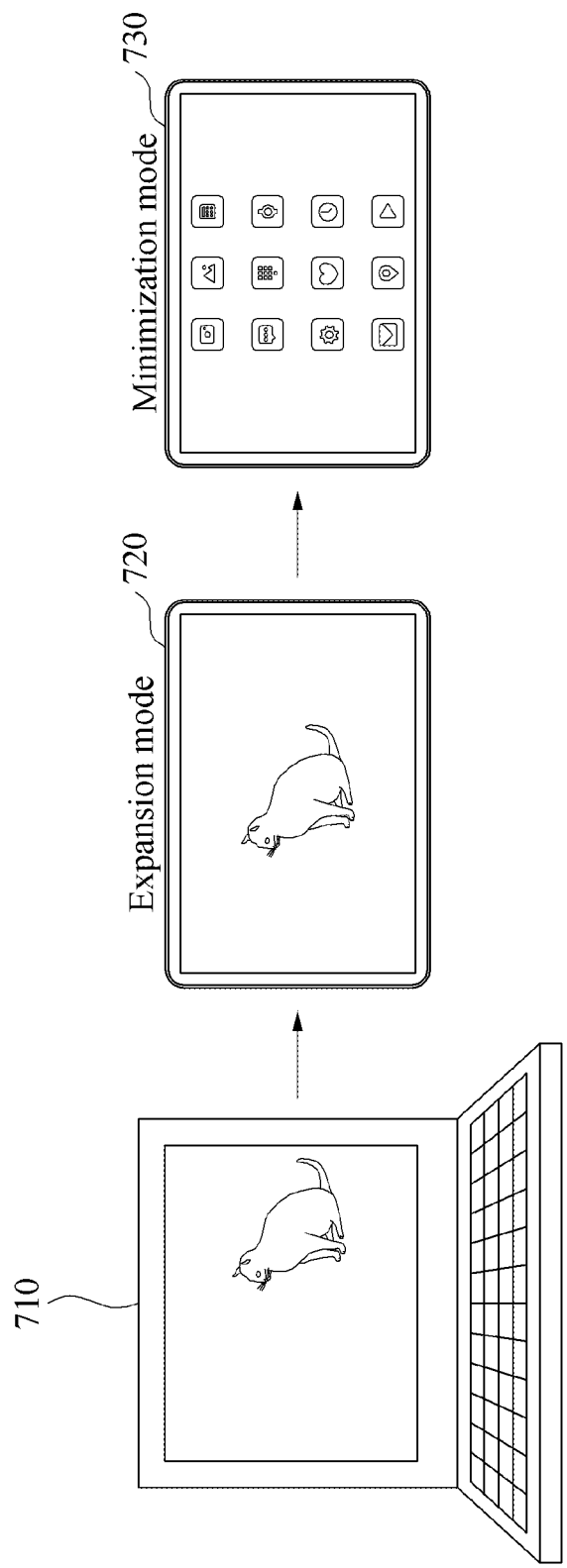
FIGS. 7A and 7B are diagrams illustrating examples of an operation of a source device and an operation of a sink device when a display mode of the sink device is changed according to example embodiments.
Figure 7B:
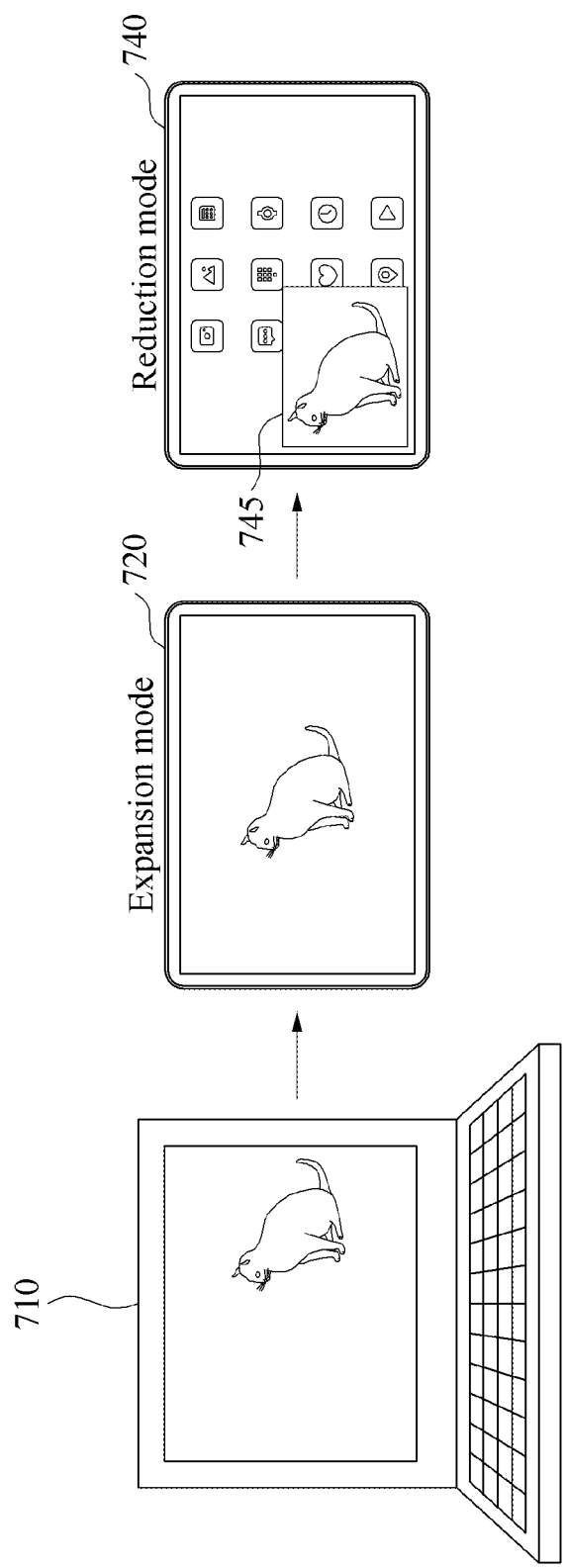

FIGS. 7A and 7B are diagrams illustrating examples of an operation of a source device and an operation of a sink device when a display mode of the sink device is changed according to example embodiments. Referring to FIG. 7A, a display mode of a sink device (e.g., the electronic devices 101, 102, and 104 of FIG. 1, the sink device 400 of FIG. 4, and/or the sink devices 630 and 650 of FIGS. 6A and 6B) may be changed from an expansion mode of displaying the expanded screen 510 generated and transmitted by the source device 710 (e.g., the electronic devices 101, 102, and 104 of FIG. 1, the source device 300 of FIG. 3, and/or the source device 610 of FIGS. 6A and 6B) without a change to a minimization mode of displaying the second screen 730 (e.g., the second screens 540 and 550 of FIG. 5B) of the sink device 630, instead of the expanded screen 720.

In an example, when the display mode of the sink device 630 is changed from the expansion mode to the minimization mode, the source device 710 may stop generating and transmitting the expanded screen 720, and accordingly the second screen 730 of the sink device 630, instead of the expanded screen 720, may be displayed on the display of the sink device 630. In this example, an input event occurring on the expanded screen 720 may be processed in a position of the second screen 730 of the sink device 630 corresponding to a position in which the input event occurs on the expanded screen 720, even though the input event disappears from the expanded screen 720 and is invisible in the minimization mode.

The sink device 630 may transmit information associated with the input event to be processed on the second screen 730 of the sink device 630 to the source device 710. The sink device 630 may process the input event in response to the control signal being received again from the source device 710. The sink device 630 may focus on a position in which a last input event occurs at a point in time at which the expanded screen 720 is minimized, and process the input event based on the focused position. For example, when the input event is a mouse input event, the sink device 630 may generate a new overlay mouse icon. The sink device 630 may move and display the overlay mouse icon based on a coordinate value changed according to a movement of the mouse input event.

In an example, when the display mode of the sink device 630 is changed from the expansion mode to the minimization mode, a resolution of the expanded screen 720 displayed in the expansion mode and a resolution of the sink device 630 that displays the second screen 730 of the sink device 630 in the minimization mode may be different from each other. In this example, the source device 710 may determine coordinates of a point corresponding to the input event based on the resolution of the sink device 630, and may transmit the coordinates of the point corresponding to the input event to the sink device 630 so that the sink device 630 may display an input object corresponding to the input event. Thus, it may be possible to naturally change screens.

Referring to FIG. 7B, the display mode of the sink device 630 according to an example embodiment may be changed from the expansion mode of displaying the expanded screen 720 generated by the source device 710 to a reduction mode of displaying the screen 740 (e.g., the screens 560 and 570 of FIG. 5C) including the reduced screen 745 generated by reducing the expanded screen 720.

If the display mode of the sink device 630 is changed from the expansion mode of displaying the expanded screen 720 to the reduction mode of displaying the screen 740 including the reduced screen 745, the source device 710 may determine a processing scheme based on a point at which an input event occurs on the screen 740. In an example, when an input event occurs in an inside area of the reduced screen 745 included in the screen 740, the source device 710 may transform coordinates received from the sink device 630 according to the first scheme to coordinates of the expanded screen 720 and may display the input event. In another example, when an input event occurs in an outside area of the reduced screen 745 included in the screen 740, the source device 710 may transmit coordinates of a point corresponding to the input event, together with a control signal to allow the sink device 630 to display an input object corresponding to the input event, to the sink device 630 according to the second scheme. For example, when the input event is a mouse input event, the source device 710 may transmit coordinate information of a cursor moved in response to the mouse input event, together with the control signal, to the sink device 630.

If the display mode is changed from the expansion mode to the reduction mode, the sink device 630 may switch an area in which an input event is to be processed from the expanded screen 720 to the screen 740 including the reduced screen 745, based on an occurrence time of a mode change event in which the display mode is changed. If the display mode is changed from the expansion mode to the reduction mode in a state in which a mouse icon is located on the expanded screen 720, the sink device 630 may switch an area in which an input event is to be processed from the expanded screen 720 to an area of the screen 740 in which an input event occurs. In an example, when an inside area of the reduced screen 745 overlaid on a lower left end of the screen 740 is focused by the first input device connected to the source device 710, the sink device 630 may process a first input event on the reduced screen 745. In another example, when an area of the screen 740 other than the reduced screen 745 is focused by the first input device connected to the source device 710, the sink device may process the first input event on the area of the screen 740 other than the screen 745.

Figure 8:
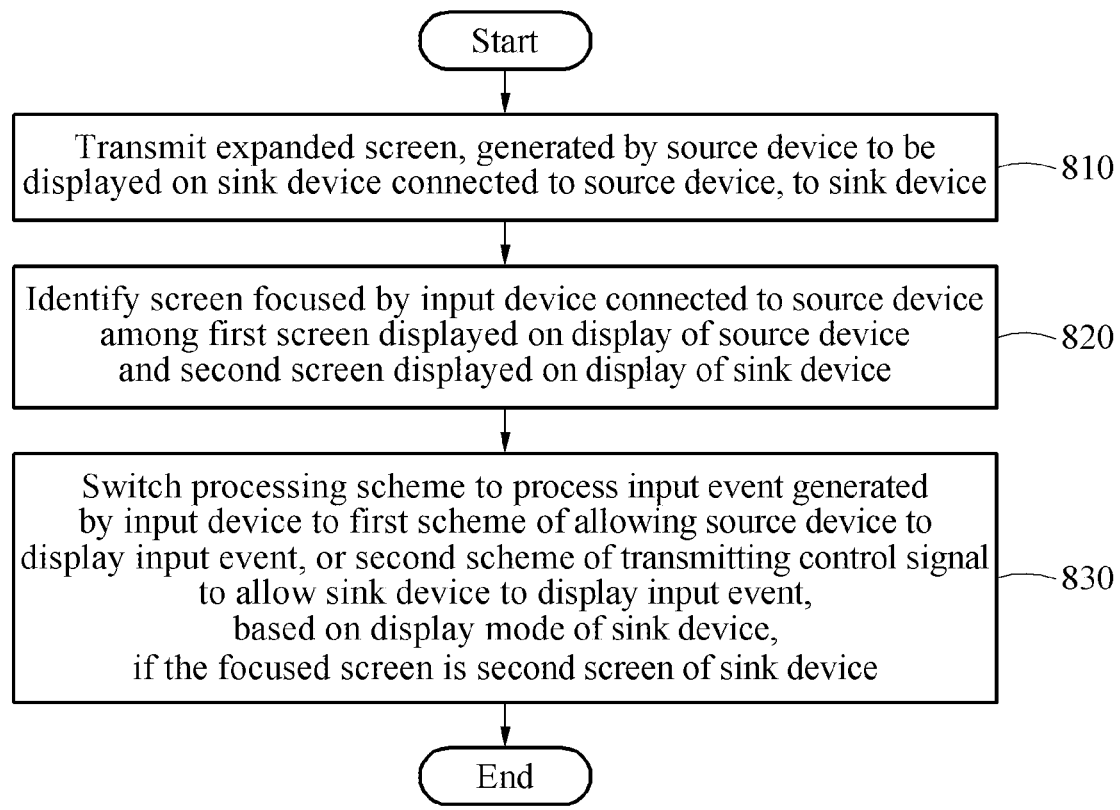
FIG. 8 is a flowchart illustrating an example of a method of operating a source device according to an example embodiment.

FIG. 8 is a flowchart illustrating an example of a method of operating a source device according to an example embodiment. In the following examples, operations may be performed sequentially, but need not necessarily be performed sequentially. For example, the order of the operations may be changed and/or at least two of the operations may be performed in parallel.

FIG. 8 illustrates a method of operating a source device (e.g., the electronic devices 101, 102, and 104 of FIG. 1, the source device 300 of FIG. 3, the source device 610 of FIGS. 6A and 6B, and/or the source device 710 of FIGS. 7A and 7B) that shares an expanded screen (e.g., the expanded screens 520 and 530 of FIG. 5A, and/or the expanded screen 720 of FIG. 7A) with at least one sink device (e.g., the electronic devices 101, 102, and 104 of FIG. 1, the sink device 400 of FIG. 4 and/or the sink devices 630 and 650 of FIGS. 6A and 6B) according to an example embodiment.

In operation 810, the source device 300 may transmit the expanded screen 520, 530, 720, generated by the source device 300 to be displayed on the sink device 400 connected to the source device 300, to the sink device 400. Here, the expanded screen 520, 530, 720 may be a screen that may be displayed on the display of the sink device 400 in association with the first screen displayed on the display of the source device 300 to expand the task space of the source device 300. The source device 300 may recognize a connection state between the source device 300 and the sink device 101, 102, 104, 400, 630, 650 through wireless communication, and transmit the expanded screen 520, 530, 720 to the sink device 400 of which the connection state is recognized.

In operation 820, the source device 300 may identify a screen focused by an input device (e.g., the input module 150 of FIG. 1, the mouse 605 and the keyboard 607 of FIG. 6A, the keyboard 1210, the wearable device 1220, the mouse 1230, and/or the touch screen 1240 of FIG. 12) connected to the source device 300 among a first screen displayed on the display of the source device 300 and a second screen displayed on the display of the sink device 400 (e.g., the expanded screens 520 and 530 of FIG. 5A, the second screens 540 and 550 of FIG. 5B, the screens 560 and 570 of FIG. 5C, the expanded screen 720 and the second screen 730 of FIG. 7A, and/or the screen 740 of FIG. 7B).

In operation 830, when the focused screen identified in operation 820 is the second screen 520, 530, 540, 550, 560, 570, 720, 730, 740 of the sink device 400, the source device 300 may switch a processing scheme of processing an input event generated by the input device 605 to a first scheme of allowing the source device 300 to display an input event, or a second scheme by which the source device 300 transmits a control signal to allow the sink device 400 to display an input event, based on the display mode of the sink device 400.

Figure 9:
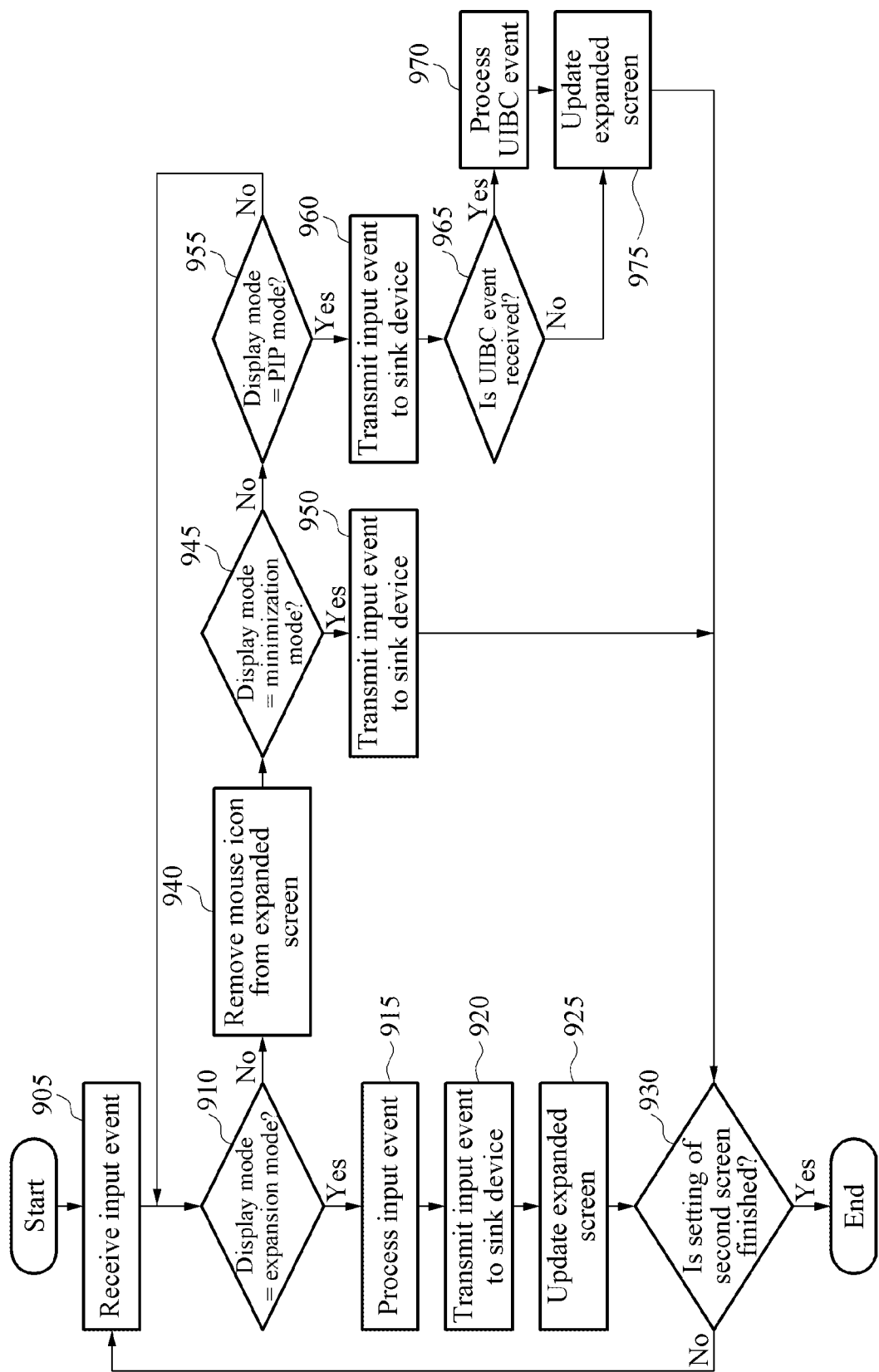
FIG. 9 is a flowchart illustrating another example of a method of operating a source device according to an example embodiment.

FIG. 9 is a flowchart illustrating another example of a method of operating a source device according to an example embodiment. In the following examples, operations may be performed sequentially, but need not necessarily be performed sequentially. For example, the order of the operations may be changed and at least two of the operations may be performed in parallel.

Referring to FIG. 9, a source device (e.g., the electronic devices 101, 102, and 104 of FIG. 1, the source device 300 of FIG. 3, and the source device 610 of FIGS. 6A and 6B, and/or the source device 710 of FIG. 7A) according to an example embodiment may update an expanded screen (e.g., the expanded screens 520 and 530 of FIG. 5A, and/or the expanded screen 720 of FIG. 7B), or a reduced screen (e.g., the reduced screens 563 and 573 of FIG. 5C, and/or the reduced screen 745 of FIG. 7B) through operations 905 to 975.

In operation 905, the source device 300 may receive an input event from an input device (e.g., the input module 150 of FIG. 1, the mouse 605 and the keyboard 607 of FIGS. 6A and 6B, and the keyboard 1210, the wearable device 1220, the mouse 1230, and/or the touch screen 1240 of FIG. 12) connected to the source device 300. If the input event is received, the source device 300 may recognize a connection state between the source device 300 and each of sink devices (e.g., the electronic devices 101, 102, and 104 of FIG. 1, the sink device 400 of FIG. 4, the sink device 630 of FIG. 6A, and/or the sink device 650 of FIG. 6B), and receive display modes of the sink devices 101, 102, 104, 400, 630, and 650. In addition, the source device 300 may receive a display mode of a sink device (e.g., a target sink device) corresponding to the input event received in operation 905 among the sink devices 101, 102, 104, 400, 630, and 650.

In operation 910, the source device 300 may determine whether the display mode is an expansion mode.

In an example, if it is determined in operation 910 that the display mode is the expansion mode, the source device 300 may directly process the input event in operation 915, and may transmit the input event to the target sink device 400 in operation 920. In this example, the source device 300 may transmit coordinate information corresponding to a point at which the input event occurs to the target sink device 400 together with the input event.

In operation 925, the source device 300 may update the expanded screen 520, 530, 720 shared by the sink device 400 by reflecting a result of processing the input event.

In operation 930, the source device 300 may determine whether setting of the second screen to share the expanded screen 520, 530, 720 with the sink device 400 is finished. If it is determined that the setting of the second screen is not finished, the source device 300 may reperform operation 905. If it is determined that the setting of the second screen is finished, the source device 300 may terminate the operation.

If it is determined in operation 910 that the display mode is not the expansion mode, the source device 300 may remove an overlaid mouse icon from the expanded screen 520, 530, 720 in operation 940. For example, when the display mode is a minimization mode or a reduction mode, the source device 300 may transmit a screen from which a mouse icon overlaid on the expanded screen 520, 530, 720 is removed, that is, a screen on which a mouse icon is not overlaid to the sink device 400, so that a mouse icon generated by the sink device 400 and a mouse icon displayed on the expanded screen 520, 530, 720 do not overlap each other on a screen of the sink device 400.

In operation 945, the source device 300 may determine whether the display mode is the minimization mode. If it is determined in operation 945 that the display mode is the minimization mode, the source device 300 may transmit the input event to the sink device 400 in operation 950, and may perform operation 930.

If it is determined in operation 945 that the display mode is not the minimization mode, the source device 300 may determine whether the display mode is the reduction (PIP) mode in operation 955. If it is determined in operation 955 that the display mode is not the reduction mode, the source device 300 may redetermine whether the display mode is the expansion mode in operation 910.

If it is determined in operation 955 that the display mode is the reduction mode, the source device 300 may transmit the input event to the sink device 400 in operation 960. If it is determined in operation 955 that the display mode is not the reduction mode, the process returns to operation 910.

Subsequently, in operation 965, the source device 300 may determine whether an input event (i.e., a UIBC event) transmitted through a UIBC is received from the sink device 400.

If it is determined in operation 965 that the UIBC event is received, the source device 300 may process the UIBC event in operation 970. The source device 300 may update the expanded screen 520, 530, 720 by reflecting a result of processing the UIBC event in operation 975. If the expanded screen 520, 530, 720 is updated, a reduced screen displayed on a PIP area may also be updated.

Alternatively, if it is determined in operation 965 that the UIBC event is not received, the source device 300 may update the expanded screen 520, 530, 720 in operation 975. In operation 975, the source device 300 may reflect the result of processing the input event in operation 915 and/or the expanded screen 520, 530, 720 updated in operation 925.

When the expanded screen 520, 530, 720 is updated in operation 925, the source device 300 may determine whether the setting of the second screen to share the expanded screen 520, 530, 720 with the sink device 400 is finished in operation 930. If it is determined that the setting of the second screen is not finished, the source device 300 may reperform operation 905. If it is determined that the setting of the second screen is finished, the source device 300 may terminate the operation.

Figure 10:
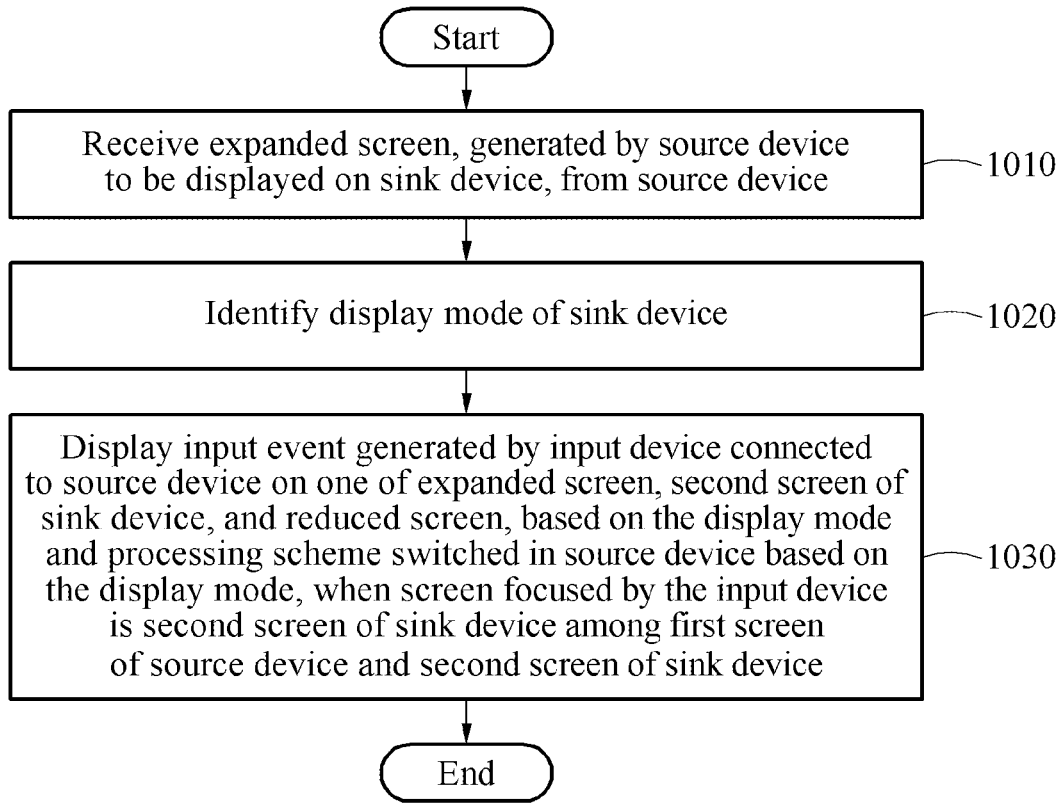
FIG. 10 is a flowchart illustrating an example of a method of operating a sink device according to an example embodiment.

FIG. 10 is a flowchart illustrating an example of a method of operating a sink device according to an example embodiment. In the following examples, operations may be performed sequentially, but need not necessarily be performed sequentially. For example, the order of the operations may be changed and at least two of the operations may be performed in parallel.

FIG. 10 illustrates a method of operating a sink device (e.g., the electronic devices 101, 102, and 104 of FIG. 1, the sink device 400 of FIG. 4, and/or the sink devices 630 and 650 of FIGS. 6A and 6B) that shares an expanded screen (e.g., the expanded screens 520 and 530 of FIG. 5A, and/or the expanded screen 720 of FIGS. 7A and 7B) generated and transmitted by a source device (e.g., the electronic devices 101, 102, and 104 of FIG. 1, the source device 300 of FIG. 3, the source device 610 of FIGS. 6A and 6B, and/or the source device 710 of FIGS. 7A and 7B) according to an example embodiment.

In operation 1010, the sink device 400 may receive the extended screen 520, 530, 720, generated by the source device 300 to be displayed on the sink device 400, from the source device 300. The expanded screen 520, 530, 720 may be a screen that may be displayed on the display of the sink device 400 in association with the first screen displayed on the display of the source device 300 to expand the task space of the source device 300.

In operation 1020, the sink device 400 may identify a display mode of the sink device 400. The display mode of the sink device 400 may be changed by, for example, a user setting or an application setting.

In operation 1030, the sink device 400 may display an input event generated by an input device (e.g., the input module 150 of FIG. 1, the mouse 605 and the keyboard 607 of FIG. 6A, and the keyboard 1210, the wearable device 1220, the mouse 1230, and/or the touch screen 1240 of FIG. 12) connected to the source device 300 on one of the expanded screen 520, 530, 720, the second screen 540, 550, 730 of the sink device 400, and a reduced screen (e.g., the reduced screens 563 and 573 of FIG. 5C, and the reduced screen 745 of FIG. 7B) generated by reducing the expanded screen 520, 530, 720, based on the display mode and a processing scheme switched in the source device 300 based on the display mode, when a screen focused by the input device is the second screen (e.g., the expanded screens 520 and 530 of FIG. 5A, the second screens 540 and 550 of FIG. 5B, the screens 560 and 570 of FIG. 5C, the expanded screen 720 and the second screen 730 of FIG. 7A, and/or the screen 740 of FIG. 7B) of the sink device 400 among a first screen of the source device 300 and the second screen of the sink device 400. Here, the expanded screen 520, 530, 720 may be a screen displayed when the display mode of the sink device 400 is an expansion mode. The second screen 540, 550, 730 of the sink device 400 may be screens displayed when the display mode of the sink device 400 is a minimization mode. The reduced screen 563, 573, 745 may be a screen displayed when the display mode of the sink device 400 is a reduction mode.

Figure 11:
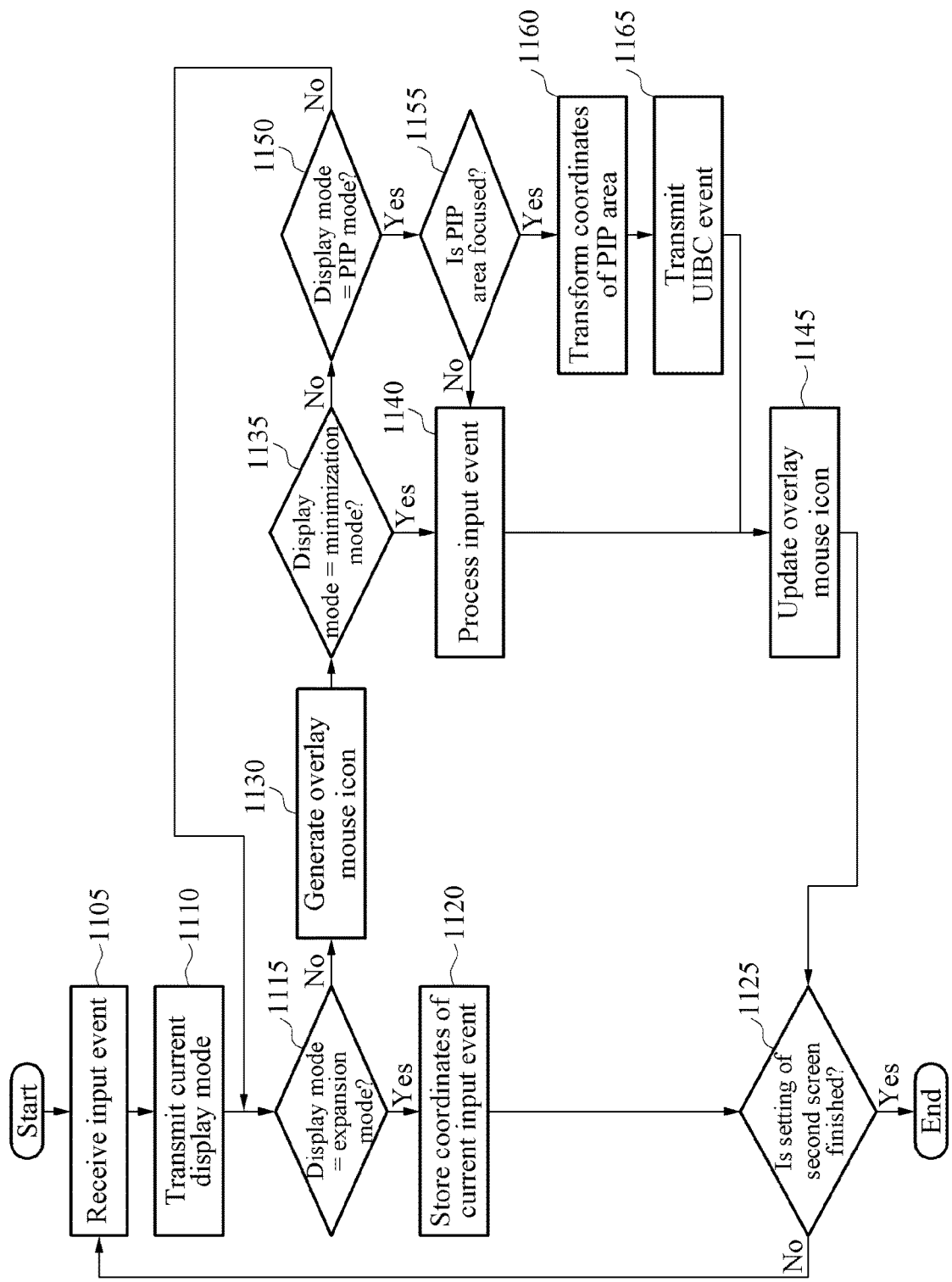
FIG. 11 is a flowchart illustrating another example of a method of operating a sink device according to an example embodiment.

FIG. 11 is a flowchart illustrating another example of a method of operating a sink device according to an example embodiment. In the following examples, operations may be performed sequentially, but need not necessarily be performed sequentially. For example, the order of the operations may be changed and at least two of the operations may be performed in parallel.

FIG. 11 illustrates a method of operating a sink device (e.g., the electronic devices 101, 102, and 104 of FIG. 1, the sink device 400 of FIG. 4, and/or the sink devices 630 and 650 of FIGS. 6A and 6B) according to an example embodiment.

In operation 1105, the sink device 400 may receive an input event from a source device (e.g., the electronic devices 101, 102, and 104 of FIG. 1, the source device 300 of FIG. 3, the source device 610 of FIGS. 6A and 6B, and/or the source device 710 of FIGS. 7A and 7B). The input event received in operation 1105 may correspond to, for example, the input event transmitted by the source device 300 in operation 920, 950, or 960 of FIG. 9.

In operation 1110, the sink device 400 may transmit a current display mode to the source device 300.

In operation 1115, the sink device 400 may determine whether the display mode is the expansion mode. If it is determined in operation 1115 that the display mode is the expansion mode, the sink device 400 may store coordinate information of a current input event occurring on the expanded screen (e.g., the expanded screens 520 and 530 of FIG. 5A, and the expanded screen 720 of FIGS. 7A and 7B) in operation 1120.

In operation 1125, the sink device 400 may determine whether setting of the second screen is finished. If it is determined that the setting of the second screen is not finished, the sink device 400 may reperform operation 1105. If it is determined that the setting of the second screen is finished, the sink device 400 may terminate the operation.

If it is determined in operation 1115 that the display mode is not the expansion mode, the sink device 400 may generate an overlay mouse icon in operation 1130. If the display mode is not the expansion mode, the sink device 400 may generate an overlay mouse icon based on coordinates in a focused display. In addition, the source device 300 may remove a mouse icon from the expanded screen 520, 530, 720 as in operation 940 described above with reference to FIG. 9, to prevent a mouse icon from being further generated.

When the overlay mouse icon is generated, the sink device 400 may determine whether the display mode is the minimization mode in operation 1135. If it is determined in operation 1135 that the display mode is the minimization mode, the sink device 400 may directly process the input event in operation 1140.

The sink device 400 may update the overlay mouse icon in operation 1145 when coordinates need to be updated by reflecting a result of processing the input event in operation 1140. The sink device 400 may perform operation 1125 after updating the overlay mouse icon.

If it is determined in operation 1135 that the display mode is not the minimization mode, the sink device 400 may determine whether the display mode is a reduction (PIP) mode in operation 1150.

If it is determined in operation 1150 that the display mode is not the reduction mode, the sink device 400 may redetermine whether the display mode is the expansion mode in operation 1115.

If it is determined in operation 1150 that the display mode is the reduction mode, the sink device 400 may determine whether a current PIP area is focused, that is, whether an inside area of a reduced screen (e.g., the reduced screens 563 and 573 of FIG. 5C, and the reduced screen 745 of FIG. 7B) is focused in operation 1155.

If it is determined in operation 1155 that the PIP area is not focused, that is, an area outside the PIP area is focused, the sink device 400 may process the input event in the same manner as in the minimize mode in operation 1140.

Alternatively, if it is determined in operation 1155 that the PIP region is focused, the sink device 400 may transform coordinates of the input event based on a resolution of the PIP area in operation 1160. In operation 1165, the sink device 400 may transmit the input event (i.e., a UIBC event) with the transformed coordinates to the source device 300 through a UIBC in operation 1160. If the UIBC event is received from the sink device 400, the source device 300 may process the UIBC event and update the expanded screen 520, 530, 720.

FIG. 12 is a diagram illustrating an input device according to an example embodiment. FIG. 12 illustrates various input devices (e.g., the input module 150 of FIG. 1, the mouse 605 and the keyboard 607 of FIGS. 6A and 6B, and the keyboard 1210, the wearable device 1220, the mouse 1230, and/or the touch screen 1240 of FIG. 12) according to an example embodiment.

The screen focused on a display may be changed or moved through an input event generated by an input device 1210, 1220, 1230, 1240 connected to the source device 300 (e.g., the electronic devices 101, 102, and 104 of FIG. 1, and the source device 710 of FIGS. 7A and 7B) or at least one sink device (e.g., the electronic devices 101, 102, and 104 of FIG. 1, the sink device 400 of FIG. 4, and/or the sink device 630 of FIGS. 6A and 6B). The input event may be of various types, for example, a voice input through a microphone input device, a gaze movement in the wearable device 1220 such as smart glasses, or the touch input 1250 to the touch screen 1240 in addition to a key input to the keyboard 1210, an input (e.g., clicking or dragging) of the mouse 1230. Various types of input events may enable a focus to move in a display.

The source device 300 may change a screen resolution of a display connected to the source device 300 to the resolution of the target sink device 400 so that a user may recognize that one display is still connected.

The example embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described example embodiments, or vice versa.

As described above, although the example embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

According to an example embodiment, a source device 101, 102, 104, 300, 610, 710 may include a wireless communication module 192, 310 (e.g., including wireless communication circuitry), a memory 130, 330, and a processor 120, 340 (e.g., including processing circuitry). The processor 120, 340 may be configured to transmit an expanded screen 520, 530, 720, generated by the source device 101, 102, 104, 300, 610, 710 to be displayed on a sink device 101, 102, 104, 400, 530, 650 connected to the source device 101, 102, 104, 300, 610, 710, to the sink device 101, 102, 104, 400, 530, 650 through the wireless communication module 192, 310, the expanded screen 520, 530, 720 being a screen displayed on a display of the sink device 101, 102, 104, 400, 530, 650 in association with a first screen displayed on a display of the source device 101, 102, 104, 300, 610, 710 to expand a task space of the source device 101, 102, 104, 300, 610, 710, to identify a screen focused by an input device 150, 605, 607, 1210, 1220, 1230, 1240 connected to the source device 101, 102, 104, 300, 610, 710 among the first screen displayed on the display of the source device 101, 102, 104, 300, 610, 710 and a second screen 520, 530, 540, 550, 560, 570, 720, 730, 740 displayed on the display of the sink device 101, 102, 104, 400, 530, 650, and to switch a processing scheme to process an input event generated by the input device 150, 605, 607, 1210, 1220, 1230, 1240, based on at least one of a display mode of the sink device 101, 102, 104, 400, 530, 650 or whether the focused screen is the first screen of the source device 101, 102, 104, 300, 610, 710 or the second screen 520, 530, 540, 550, 560, 570, 720, 730, 740 of the sink device 101, 102, 104, 400, 530, 650.

According to an example embodiment, when the focused screen is the second screen 520, 530, 540, 550, 560, 570, 720, 730, 740 of the sink device 101, 102, 104, 400, 530, 650 and when the display mode of the sink device 101, 102, 104, 400, 530, 650 is a reduction mode or a minimization mode, the processor 120, 340 may be configured to switch the processing scheme from a first scheme of allowing the source device 101, 102, 104, 300, 610, 710 to display the input event to a second scheme by which the source device 101, 102, 104, 300, 610, 710 transmits a control signal to allow the sink device 101, 102, 104, 400, 530, 650 to display the input event to the sink device 101, 102, 104, 400, 530, 650.

According to an example embodiment, when the display mode of the sink device 101, 102, 104, 400, 530, 650 is changed from an expansion mode of displaying the expanded screen 520, 530, 720 to a reduction mode of displaying a reduced screen 563, 573, 745 generated by reducing the expanded screen 520, 530, 720, or a minimization mode of displaying the second screen 540, 550, 730 of the sink device 101, 102, 104, 400, 530, 650 instead of the expanded screen 520, 530, 720 and when the focused screen is the second screen 520, 530, 540, 550, 560, 570, 720, 730, 740 of the sink device 101, 102, 104, 400, 530, 650, or when the focused screen is changed from the first screen of the source device 101, 102, 104, 300, 610, 710 to the second screen 520, 530, 540, 550, 560, 570, 720, 730, 740 of the sink device 101, 102, 104, 400, 530, 650 and when the display mode of the sink device 101, 102, 104, 400, 530, 650 is changed to the reduction mode or the minimization mode, the processor 120, 340 may be configured to switch the processing scheme from the first scheme to the second scheme.

According to an example embodiment, when the display mode of the sink device 101, 102, 104, 400, 530, 650 is the reduction mode and when a point at which the input event occurs is an inside area 655 of the reduced screen 563, 573, 745, the processor 120, 340 may be configured to receive, from the sink device 101, 102, 104, 400, 530, 650, position information of the point at which the input event occurs on the inside area 655 of the reduced screen 563, 573, 745, and update the expanded screen 520, 530, 720 based on the position information.

According to an example embodiment, the processor 120, 340 may be configured to update at least one of the reduced screen 563, 573, 745 or the expanded screen 520, 530, 720 by converting position information of a point at which the input event occurs according to a resolution of the reduced screen 563, 573, 745, received from the sink device 101, 102, 104, 400, 530, 650, to match a resolution of a screen of the source device 101, 102, 104, 300, 610, 710.

According to an example embodiment, when the display mode of the sink device 101, 102, 104, 400, 530, 650 is the reduction mode, and a point at which the input event occurs is an outside area 653 of the reduced screen 563, 573, 745, the processor 120, 340 may be configured to allow the sink device 101, 102, 104, 400, 530, 650 to display an input object corresponding to the input event by transmitting coordinates of a point corresponding to the input event to the sink device 101, 102, 104, 400, 530, 650 according to the second scheme.

According to an example embodiment, when the display mode of the sink device 101, 102, 104, 400, 530, 650 is the minimization mode and when the focused screen is the second screen 520, 530, 540, 550, 560, 570, 720, 730, 740 of the sink device 101, 102, 104, 400, 530, 650, if a resolution of the expanded screen 520, 530, 720 and a resolution of the sink device 101, 102, 104, 400, 530, 650 are different from each other, the processor 120, 340 may be configured to determine coordinates of a point corresponding to the input event based on the resolution of the sink device 101, 102, 104, 400, 530, 650, transmit the coordinates of the point corresponding to the input event to the sink device 101, 102, 104, 400, 530, 650, and allow the sink device 101, 102, 104, 400, 530, 650 to display the input object corresponding to the input event.

According to an example embodiment, when the display mode of the sink device 101, 102, 104, 400, 530, 650 is changed from the expansion mode to the minimization mode and when the focused screen is the second screen 520, 530, 540, 550, 560, 570, 720, 730, 740 of the sink device 101, 102, 104, 400, 530, 650, if the resolution of the expanded screen 520, 530, 720 and the resolution of the sink device 101, 102, 104, 400, 530, 650 are different from each other, the processor 120, 340 may be configured to determine coordinates of a point corresponding to the input event based on the resolution of the sink device 101, 102, 104, 400, 530, 650, transmit the coordinates of the point corresponding to the input event to the sink device 101, 102, 104, 400, 530, 650, and allow the sink device 101, 102, 104, 400, 530, 650 to display the input object corresponding to the input event.

According to an example embodiment, the input event may include a mouse input event. When the focused screen is the second screen 520, 530, 540, 550, 560, 570, 720, 730, 740 of the sink device 101, 102, 104, 400, 530, 650, when the display mode of the sink device 101, 102, 104, 400, 530, 650 is the reduction mode or the minimization mode, and when the input event is the mouse input event, the processor 120, 340 may be configured to transmit, to the sink device 101, 102, 104, 400, 530, 650, a control signal to allow the sink device 101, 102, 104, 400, 530, 650 to display a cursor moved in response to the mouse input event, together with coordinate information of the cursor, according to the second scheme.

According to an example embodiment, when the display mode of the sink device 101, 102, 104, 400, 530, 650 is the reduction mode or the minimization mode, and when the focused screen corresponding to a screen on which a last input event is generated by the input device 150, 605, 607, 1210, 1220, 1230, 1240 connected to the source device 101, 102, 104, 300, 610, 710 is the second screen 520, 530, 540, 550, 560, 570, 720, 730, 740 of the sink device 101, 102, 104, 400, 530, 650, the processor 120, 340 may transmit, to the sink device 101, 102, 104, 400, 530, 650, the reduced screen 563, 573, 745 on which an image of an input object that is previously overlaid on the expanded screen 520, 530, 720 is not overlaid.

According to an example embodiment, a sink device 101, 102, 104, 400, 530, 650 may include a wireless communication module 192, 410, a display module 160, 420, a memory 130, 430, and a processor 120, 440. The processor 120, 440 may be configured to receive an expanded screen 520, 530, 720, generated by a source device 101, 102, 104, 300, 610, 710 to be displayed on the sink device 101, 102, 104, 400, 530, 650 through the wireless communication module 192, 410, the expanded screen 520, 530, 720 being a screen displayed on a display of the sink device 101, 102, 104, 400, 530, 650 in association with a first screen displayed on a display of the source device 101, 102, 104, 300, 610, 710 to expand a task space of the source device 101, 102, 104, 300, 610, 710, to identify a display mode of the display module 160, 420, and to display an input event generated by an input device 150, 605, 607, 1210, 1220, 1230, 1240 connected to the source device 101, 102, 104, 300, 610, 710 on one of the expanded screen 520, 530, 720, a second screen 540, 550, 730 of the sink device 101, 102, 104, 400, 530, 650, and a reduced screen 563, 573, 745 generated by reducing the expanded screen 520, 530, 720, according to the display mode and a processing scheme switched in the source device 101, 102, 104, 300, 610, 710 based on the display mode, when a screen focused by the input device 150, 605, 607, 1210, 1220, 1230, 1240 is a second screen 520, 530, 540, 550, 560, 570, 720, 730, 740 displayed on the display of the sink device 101, 102, 104, 400, 530, 650 among the first screen of the source device 101, 102, 104, 300, 610, 710 and the second screen 520, 530, 540, 550, 560, 570, 720, 730, 740 of the sink device 101, 102, 104, 400, 530, 650.

According to an example embodiment, the processing scheme may include at least one of a first scheme of allowing the input event on the first screen of the source device 101, 102, 104, 300, 610, 710, and a second scheme by which the source device 101, 102, 104, 300, 610, 710 transmits a control signal to allow the input event to be displayed on the second screen 520, 530, 540, 550, 560, 570, 720, 730, 740 of the sink device 101, 102, 104, 400, 530, 650 to the sink device 101, 102, 104, 400, 530, 650. When the focused screen is the second screen 520, 530, 540, 550, 560, 570, 720, 730, 740 of the sink device 101, 102, 104, 400, 530, 650, and when the display mode is a reduction mode of displaying the reduced screen 563, 573, 745 or a minimization mode of displaying the second screen 540, 550, 730 of the sink device 101, 102, 104, 400, 530, 650 instead of the expanded screen 520, 530, 720, the processor 120, 440 may be configured to display the input event on the second screen 520, 530, 540, 550, 560, 570, 720, 730, 740 of the sink device 101, 102, 104, 400, 530, 650 according to the control signal received from the source device 101, 102, 104, 300, 610, 710 by the second scheme.

According to an example embodiment, when the display mode is the reduction mode and when a point at which the input event occurs on an outside area 653 of the reduced screen 563, 573, 745, the processor 120, 440 may be configured to display an input object corresponding to the input event based on coordinates of a point corresponding to the input event, received from the source device 101, 102, 104, 300, 610, 710 according to the second scheme.

According to an example embodiment, when the display mode is the reduction mode and when a point at which the input event occurs is an inside area 655 of the reduced screen 563, 573, 745, the processor 120, 440 may be configured to transmit information associated with the input event occurring on the inside area 655 of the reduced screen 563, 573, 745 to the source device 101, 102, 104, 300, 610, 710. The information associated with the input event may include at least one of the type of the input event, a resolution of the reduced screen 563, 573, 745 on which the input event occurs, or coordinate information corresponding to the point at which the input event occurs based on the resolution of the reduced screen 563, 573, 745.

According to an example embodiment, the input event may include a mouse input event. When the focused screen is the second screen 520, 530, 540, 550, 560, 570, 720, 730, 740 of the sink device 101, 102, 104, 400, 530, 650, when the display mode of the sink device 101, 102, 104, 400, 530, 650 is the reduction mode or the minimization mode, and when the input event is the mouse input event, the processor 120, 440 may be configured to display an input object corresponding to the mouse input event, based on coordinate information of a cursor moved in response to the mouse input event and a control signal to allow the sink device 101, 102, 104, 400, 530, 650 to display the cursor moved in response to the mouse input event. The coordinate information and the control signal may be received from the source device according to the second scheme.

According to an example embodiment, when the display mode of the sink device 101, 102, 104, 400, 530, 650 is the reduction mode or the minimization mode, and when the focused screen is the second screen 520, 530, 540, 550, 560, 570, 720, 730, 740 of the sink device 101, 102, 104, 400, 530, 650, the processor 120, 440 may be configured to receive information associated with the input event from the source device 101, 102, 104, 300, 610, 710, and display the input event on the second screen 520, 530, 540, 550, 560, 570, 720, 730, 740 of the sink device 101, 102, 104, 400, 530, 650 based on the information associated with the input event.

According to an example embodiment, when the display mode is the reduction mode or the minimization mode, and when the focused screen is the second screen 520, 530, 540, 550, 560, 570, 720, 730, 740 of the sink device 101, 102, 104, 400, 530, 650, the processor 120, 440 may be configured to display an input object corresponding to the input event on the focused second screen 520, 530, 540, 550, 560, 570, 720, 730, 740 of the sink device 101, 102, 104, 400, 530, 650.

According to an example embodiment, a method of operating a source device 101, 102, 104, 300, 610, 710 may include operation 810 of transmitting an expanded screen 520, 530, 720, generated by the source device 101, 102, 104, 300, 610, 710 to be displayed on a sink device 101, 102, 104, 400, 530, 650 connected to the source device 101, 102, 104, 300, 610, 710, to the sink device 101, 102, 104, 400, 530, 650, the expanded screen 520, 530, 720 being a screen displayed on a display of the sink device 101, 102, 104, 400, 530, 650 in association with a first screen displayed on a display of the source device 101, 102, 104, 300, 610, 710 to expand a task space of the source device 101, 102, 104, 300, 610, 710, operation 820 of identifying a screen focused by an input device 150, 605, 607, 1210, 1220, 1230, 1240 connected to the source device 101, 102, 104, 300, 610, 710 among the first screen displayed on the display of the source device 101, 102, 104, 300, 610, 710 and a second screen 520, 530, 540, 550, 560, 570, 720, 730, 740 displayed on the display of the sink device 101, 102, 104, 400, 530, 650, and operation 830 of switching a processing scheme to process an input event generated by the input device 150, 605, 607, 1210, 1220, 1230, 1240, based on a display mode of the sink device 101, 102, 104, 400, 530, 650 to a first scheme of allowing the source device 101, 102, 104, 300, 610, 710 to display the input event or a second scheme of transmitting a control signal to allow the sink device 101, 102, 104, 400, 530, 650 to display the input event, when the focused screen is the second screen 520, 530, 540, 550, 560, 570, 720, 730, 740 of the sink device 101, 102, 104, 400, 530, 650.

According to an example embodiment, a method of operating a sink device 101, 102, 104, 400, 530, 650 may include operation 1010 of receiving, from a source device 101, 102, 104, 300, 610, 710, an expanded screen 520, 530, 720, generated by the source device 101, 102, 104, 300, 610, 710 to be displayed on the sink device 101, 102, 104, 400, 530, 650 connected to the source device 101, 102, 104, 300, 610, 710, the expanded screen 520, 530, 720 being a screen displayed on a display of the sink device 101, 102, 104, 400, 530, 650 in association with a first screen displayed on a display of the source device 101, 102, 104, 300, 610, 710 to expand a task space of the source device 101, 102, 104, 300, 610, 710, operation 1020 of identifying a display mode of the sink device 101, 102, 104, 400, 530, 650, and operation 1030 of displaying an input event generated by an input device 150, 605, 607, 1210, 1220, 1230, 1240 connected to the source device 101, 102, 104, 300, 610, 710 on one of the expanded screen 520, 530, 720, a second screen 540, 550, 730 of the sink device 101, 102, 104, 400, 530, 650, and a reduced screen 563, 573, 745 generated by reducing the expanded screen 520, 530, 720, according to the display mode and a processing scheme switched in the source device 101, 102, 104, 300, 610, 710 based on the display mode, when a screen focused by the input device 150, 605, 607, 1210, 1220, 1230, 1240 is a second screen displayed on the display of the sink device 101, 102, 104, 400, 530, 650 among the first screen of the source device 101, 102, 104, 300, 610, 710 and the second screen 520, 530, 540, 550, 560, 570, 720, 730, 740 of the sink device 101, 102, 104, 400, 530, 650.

What is claimed is:

1. A source device comprising:
   a wireless communication module including a communication circuit;
   a memory; and
   at least one processor
   configured to:
      transmit an expanded screen, generated by the source device for display on a sink device connected to the source device, to the sink device through the wireless communication module, the expanded screen being a screen for display on a display of the sink device in association with a first screen displayed on a display of the source device in an expansion mode;
identify a screen focused by an input device connected to the source device among the first screen and a second screen displayed on the display of the sink device; and
switch between first and second schemes for displaying an input event generated by the input device, based on at least one of a display mode of the sink device or whether the focused screen is the first screen or the second screen,
wherein, in the first scheme, the input event is displayed on the first screen and, in the second scheme, the source device transmits a control signal to the sink device to display the input event, and
wherein, when the focused screen is the second screen and when the display mode of the sink device is a reduction mode in which the expanded screen is reduced on the second screen or a minimization mode in which the expanded screen is minimized on the second screen, at least one processor is configured to switch the processing scheme from the first scheme to the second scheme.

2. The source device of claim 1, wherein at least one processor is configured to switch the processing scheme from the first scheme to the second scheme:
when the display mode of the sink device is changed from the expansion mode to the reduction mode or the minimization mode and when the focused screen is the second screen, or
when the focused screen is changed from the first screen to the second screen and when the display mode of the sink device is changed to the reduction mode or the minimization mode.

3. The source device of claim 1, wherein, when the display mode of the sink device is the reduction mode and when a point at which the input event occurs is an inside area of the reduced expanded screen, at least one processor is configured to receive, from the sink device, position information of the point at which the input event occurs on the inside area, and update the expanded screen based on the position information.

4. The source device of claim 2, wherein at least one processor is configured to update at least one of the reduced screen or the expanded screen by converting position information of a point at which the input event occurs according to a resolution of the reduced screen, received from the sink device, to match a resolution of a screen of the source device.

5. The source device of claim 1, wherein, when the display mode of the sink device is the reduction mode and when a point at which the input event occurs is an outside area of the reduced expanded screen, at least one processor is configured to allow the sink device to display an input object corresponding to the input event by transmitting to the sink device, coordinates of a point corresponding to the input event, according to the second scheme.

6. The source device of claim 1, wherein, when the display mode of the sink device is the minimization mode and when the focused screen is the second screen, when a resolution of the expanded screen and a resolution of the sink device are different from each other, at least one processor is configured to determine coordinates of a point corresponding to the input event based on the resolution of the sink device, transmit, to the sink device, the coordinates of the point corresponding to the input event, and allow the sink device to display an input object corresponding to the input event.

7. The source device of claim 6, wherein, when the display mode of the sink device is changed from the expansion mode to the minimization mode and when the focused screen is the second screen, when the resolution of the expanded screen and the resolution of the sink device are different from each other, at least one processor is configured to determine coordinates of a point corresponding to the input event based on the resolution of the sink device, transmit, to the sink device, the coordinates of the point corresponding to the input event, and allow the sink device to display an object corresponding to the input event.

8. The source device of claim 1, wherein
the input event comprises a mouse input event, and
when the focused screen is the second screen, when the display mode of the sink device is the reduction mode or the minimization mode, and when the input event is the mouse input event, at least one processor is configured to transmit, to the sink device, a control signal to allow the sink device to display a cursor moved in response to the mouse input event, together with coordinate information of the cursor, according to the second scheme.

9. The source device of claim 1, wherein, when the display mode of the sink device is a reduction mode or a minimization mode, and when the focused screen corresponding to a screen on which a last input event is generated by the input device connected to the source device is the second screen, at least one processor is configured to transmit, to the sink device, a reduced screen on which an image of an object that is previously overlaid on the expanded screen is not overlaid.

10. A sink device comprising:
a wireless communication module including a communication circuit;
a display module including a display;
a memory; and
at least one processor
configured to:
receive an expanded screen, generated by a source device for display on the sink device, from the source device through the wireless communication module, the expanded screen being a screen for display on the display of the sink device in association with a first screen displayed on a display of the source device in an expansion mode;
identify a display mode of the display module; and
display an input event on the display of the sink device generated by an input device connected to the source device on one of the expanded screen, a second screen of the sink device, or a reduced screen generated by reducing the expanded screen, according to the display mode and a scheme switched in the source device, based on the display mode, between first and second schemes, when a screen focused by the input device is the second screen among the first screen and the second screen,
wherein, in the first scheme, the input event is displayed on the first screen and, in the second scheme, the sink device receives a control signal from the source device to display the input event, and
wherein, when the focused screen is the second screen and when the display mode of the sink device is a reduction mode for displaying the reduced screen or a minimization mode in which the expanded screen is minimized on the second screen, at least one processor is configured to display the input event on the second screen according to the control signal received from the source device by the second scheme.

11. The sink device of claim 10, wherein, when the display mode is the reduction mode and when a point at which the input event occurs is an outside area of the reduced expanded screen, at least one processor is configured to display an input object corresponding to the input event based on coordinates of a point corresponding to the input event, received from the source device according to the second scheme.

12. The sink device of claim 10, wherein
when the display mode is the reduction mode and when a point at which the input event occurs is an inside area of the reduced expanded screen, at least one processor is configured to transmit information associated with the input event occurring on the inside area to the source device, and
the information associated with the input event comprises at least one of a type of the input event, a resolution of the reduced screen on which the input event occurs, or coordinate information corresponding to the point at which the input event occurs based on the resolution of the reduced screen.

13. The sink device of claim 10, wherein
the input event comprises a mouse input event, and
when the focused screen is the second screen, when a display mode of the display module is the reduction mode or the minimization mode, and when the input event is the mouse input event, at least one processor is configured to display an object corresponding to the mouse input event, based on coordinate information of a cursor moved in response to the mouse input event and a control signal to allow the sink device to display the cursor moved in response to the mouse input event, wherein the coordinate information and the control signal are received from the source device according to the second scheme.

14. The sink device of claim 10, wherein, when the display mode of the sink device is the reduction mode or the minimization mode and when the focused screen is the second screen, at least one processor is configured to:
receive information associated with the input event from the source device; and
display the input event on the second screen based on the information associated with the input event.

15. The sink device of claim 10, wherein, when the display mode is a reduction mode or a minimization mode and when the focused screen is the second screen, at least one processor is configured to display an input object corresponding to the input event on the focused second screen.

16. A method of operating a source device, the method comprising:
transmitting an expanded screen, generated by the source device for display on a sink device connected to the source device, to the sink device, the expanded screen being a screen for display on a display of the sink device in association with a first screen displayed on a display of the source device in an expansion mode;
identifying a screen focused by an input device connected to the source device among the first screen and a second screen displayed on the display of the sink device; and
switching between first and second schemes for displaying an input event generated by the input device, based on at least one of a display mode of the sink device or whether the focused screen is the first screen or the second screen,
wherein, in the first scheme, the input event is displayed on the first screen and, in the second scheme, the source device transmits a control signal to the sink device to display the input event, and
wherein, when the focused screen is the second screen and when the display mode of the sink device is a reduction mode in which the expanded screen is reduced on the second screen or a minimization mode in which the expanded screen is minimized on the second screen, the processing scheme is switched from the first scheme to the second scheme.

17. A method of operating a sink device, the method comprising:
receiving an expanded screen, generated by a source device for display on the sink device, from the source device, the expanded screen being a screen for display on a display of the sink device in association with a first screen displayed on a display of the source device in an expansion mode;
identifying a display mode of the sink device; and
displaying an input event on the display of the sink device generated by an input device connected to the source device on one of the expanded screen, a second screen of the sink device, or a reduced screen generated by reducing the expanded screen, according to the display mode and a scheme switched in the source device, based on the display mode, between first and second schemes, when a screen focused by the input device is the second screen among the first screen and the second screen,
wherein, in the first scheme, the input event is displayed on the first screen and, in the second scheme, the sink device receives a control signal from the source device to display the input event on the second screen, and
wherein, when the focused screen is the second screen and when the display mode of the sink device is a reduction mode for displaying the reduced screen or a minimization mode in which the expanded screen is minimized on the second screen, the input event on the second screen is displayed according to the control signal received from the source device by the second scheme.

18. A non-transitory computer-readable storage medium storing instructions that, when executed by at least one processor, cause the at least one processor to perform the method of claim 16.

* * * * *